(12) United States Patent      (10) Patent No.:    US 12,665,750 B2
Eldefrawy                           (45) Date of Patent:       Jun. 23, 2026

(54) OVERLAY FOR COMMUNICATION ANONYMITY AND PRIVACY IN A COMPUTER NETWORK

(71) Applicant: SRI International, Menlo Park, CA (US)

(72) Inventor: Karim Eldefrawy, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 593 days.

(21) Appl. No.: 18/004,836

(22) PCT Filed: Jul. 9, 2021

(86) PCT No.: PCT/US2021/041115
§ 371 (c)(1),
(2) Date: Jan. 9, 2023

(87) PCT Pub. No.: WO2022/011278
PCT Pub. Date: Jan. 13, 2022

(65) Prior Publication Data
US 2023/0308263 A1      Sep. 28, 2023

Related U.S. Application Data

(60) Provisional application No. 63/050,274, filed on Jul. 10, 2020.

(51) Int. Cl.
H04L 9/40          (2022.01)
H04L 9/08          (2006.01)

(52) U.S. Cl.
CPC .......... H04L 9/0847 (2013.01); H04L 9/0825 (2013.01); H04L 2209/42 (2013.01)

(58) Field of Classification Search
CPC . H04L 9/0847; H04L 9/0825; H04L 12/4633; H04L 12/4641; H04L 2209/42
See application file for complete search history.

(56) References Cited

U.S. PATENT DOCUMENTS 11,507,676 B2      11/2022 Eldefrawy et al.
2007/0016663 A1*   1/2007 Weis .................... G06F 11/1425
                                              714/E11.073

(Continued)

OTHER PUBLICATIONS

"Common Open Research Emulator (Core)", U.S. Naval Research Laboratory, Retrieved from: https://www.nrl.navy.mil/Our-Work/Areas-of-Research/Information-Technology/NCS/CORE/, Accessed on: Sep. 6, 2018, 2 pp.

(Continued)

*Primary Examiner* — Thaddeus J Plecha
(74) *Attorney, Agent, or Firm* — Shumaker & Sieffert, P.A.

(57) ABSTRACT

A plurality of nodes connected to the plurality of servers that form a broadcasting overlay over a network for performing best effort broadcasting of data through the broadcasting overlay, may receive, from a first computing device of a plurality of computing devices connected to the broadcasting overlay, a first encrypted message and may perform best effort broadcasting of the first encrypted message through the broadcasting overlay to send, in an end-to-end encrypted manner, the first encrypted message to a first service of a plurality of services. The plurality of nodes may also receive, from the plurality of services, a second encrypted message, and may perform best effort broadcasting of the second encrypted message to propagate the second encrypted message through the broadcasting overlay to send, in the end-to-end encrypted manner, the second encrypted message to a second computing device of the plurality of computing devices.

20 Claims, 9 Drawing Sheets

(56)                References Cited

U.S. PATENT DOCUMENTS

2010/0307636 A1    12/2010  Uemura
2016/0112255 A1*    4/2016  Li ....................... H04L 41/0803
                                                          709/220
2017/0073211 A1     3/2017  Wilson et al.
2019/0386969 A1*   12/2019  Verzun ................. G06F 21/606
2020/0084103 A1*    3/2020  Miller .................. H04L 45/586

OTHER PUBLICATIONS

"Develop faster. Run anywhere.", Docker Telepresence, Retrieved from: https://www.docker.com/, Accessed on: Accessed on: Sep. 6, 2018, 13 pp.
"Empowering Consensus, Building Trust Together", Thunder, Retrieved from: https://www.xunlei.com/, Accessed on: Sep. 6, 2018, 3 pp.
"FormalWare at SRI", Retrieved from: https://fm.csl.sri.com/, Accessed on Sep. 6, 2018, 2 pp.
"IP multicast", Wikipedia, page was last edited on Jan. 15, 2023, Retrieved from: https://en.wikipedia.org/wiki/IP_multicast, Accessed on : Apr. 14, 2023, 10 pp.
"IPFS powers the Distributed Web", IPFS, Retrieved from: https://ipfs.tech/, Accessed on: Sep. 6, 2018, 8 pp.
"KULeuven-COSIC / SCALE-MAMBA", Retrieved from: https://github.com/KULeuven-COSIC/SCALE-MAMBA, Accessed on: Sep. 6, 2018, 3 pp.
"Layers of the TCP/IP network stack, and contrasting its layers with the OSI stack", Retrieved from: www.researchgate.net/publication/327483011/figure/fig2/AS:668030367436802@1536282259885/Thelogical- mapping-between-OSI-basic-reference-model-and-the-TCP-IP-stack.jpg, Accessed on: Apr. 14, 2023, 1 pp.
"SCALE-MAMBA Software", Retrieved from: https://homes.esat.kuleuven.be/~nsmart/SCALE/, Accessed on: Sep. 6, 2018, 4 pp.
"Share, freely and privately", Jami, Retrieved from: https://jami.net/, Accessed on: Sep. 6, 2018, 7 pp.
"SRI International's Computer Science Laboratory", Retrieved from: https://github.com/SRI-CSL, Accessed on: Sep. 6, 2018, 3 pp.
Akavia et al., "Topology—Hiding Computation Beyond Logarithmic Diameter", Advances in Cryptology—EUROCRYPT 2017—36th Annual International Conference on the Theory and Applications of Cryptographic Techniques, Apr. 30, 2017, pp. 609-637.
Akavia et al., "Topology—Hiding Computation on All Graphs", Advances in Cryptology—CRYPTO 2017—37th Annual International Cryptology Conference, Aug. 20, 2017, pp. 447-467.
Albrecht, "lwe-estimator", Retrieved from: https://bitbucket.org/malb/lwe-estimator/src/master/, Accessed on: Sep. 6, 2018, 5 pp.
Aly et al., "SCALE-MAMBA v1.14 : Documentation", Retrieved from: https://homes.esat.kuleuven.be/~nsmart/SCALE/Documentation.pdf, Aug. 2, 2021, 170 pp.
Araki et al., "Generalizing the SPDZ Compiler For Other Protocols", ACM Conference on Computer and Communications Security., Oct. 2, 2018, 33 pp.
Ateniese et al., "Some Open Issues and New Directions in Group Signatures", Proceedings of the Third International Conference on Financial Cryptography, Aug. 30, 1999, pp. 196-211.
Badertscher et al., "Ouroboros Genesis: Composable Proof-of-Stake Blockchains with Dynamic Availability", Cryptology ePrint Archive, Report 2018/378, Sep. 2018, 66 pp.
Baker, "Rethinking Encryption", Lawfare, Oct. 22, 2019, 8 pp.
Ball et al., "Exploring the Boundaries of Topology—Hiding Computation", Advances in Cryptology—EUROCRYPT 2018—37th Annual International Conference on the Theory and Applications of Cryptographic Techniques, Apr. 29, 2018, 32 pp.
Baron et al., "5PM: Secure Pattern Matching", International Conference on Security and Cryptography for Networks, Springer, Sep. 5, 2012, 51 pp.
Baron et al., "Communication—Optimal Proactive Secret Sharing for Dynamic Groups", Applied Cryptography and Network Security, Springer International Publishing, Apr. 2015, 24 pp.

Baron et al., "How to Withstand Mobile Virus Attacks, Revisited", Proceedings of the 2014 ACM Symposium on Principles of Distributed Computing, Jul. 15, 2014, 34 pp.
Beaver, "Efficient Multiparty Protocols Using Circuit Randomization", Proceedings of Annual International Cryptology Conference—Advances in Cryptology, CRYPTO '91, vol. 576, Sep. 11, 1991, pp. 420-432.
Bellare et al., "Foundations of Group Signatures: The Case of Dynamic Groups", Proceedings of the 2005 International Conference on Topics in Cryptology, CT-RSA'05, vol. 3376, Feb. 14, 2005, 32 pp.
Ben-David et al., "FairplayMP—A System for Secure Multi-Party Computation", Proceedings of the 15th ACM conference on Computer and communications security, Oct. 2008, 10 pp.
Ben-Sasson et al., "Near-Linear Unconditionally—Secure Multiparty Computation with a Dishonest Minority?", Proceedings of the 32Nd Annual Cryptology Conference on Advances in Cryptology—CRYPTO 2012, vol. 7417, Aug. 19, 2012, 21 pp.
Bendlin et al., "Semi-Homomorphic Encryption and Multiparty Computation", Advances in Cryptology—EUROCRYPT 2011, vol. 6632, May 2011, 24 pp.
Böhme et al., "On the PET Workshop Panel "Mix Cascades Versus Peer-to-Peer: Is One Concept Superior?"", PET'04: Proceedings of the 4th international conference on Privacy Enhancing Technologies, May 26, 2004, 13 pp.
Boneh et al., "Aggregate and Verifiably Encrypted Signatures from Bilinear Maps", Advances in Cryptology—EUROCRYPT 2003, May 4, 2003, 22 pp.
Boneh et al., "Efficient Generation of Shared RSA Keys", Advances in Cryptology—CRYPTO '97, Aug. 17, 1997, 15 pp.
Boneh et al., "Identity-Based Encryption from the Weil Pairing", Advances in Cryptology—CRYPTO 2001, vol. 2139, Aug. 19, 2001, 31 pp.
Boneh et al., "Short Group Signatures", Advances in Cryptology—CRYPTO 2004, Aug. 15, 2004, 19 pp.
Bresson et al., "Threshold Ring Signatures and Applications to Ad-hoc Groups", Proceedings of the 22nd Annual International Cryptology Conference on Advances in Cryptology, CRYPTO '02, Aug. 18, 2002, 16 pp.
Cardozo et al., "Secure Messaging? More Like A Secure Mess.", Electronic Frontier Foundation, Mar. 26, 2018, 8 pp.
Chaum, "Group Signatures", Proceedings of the 10th Annual International Conference on Theory and Application of Cryptographic Techniques, EUROCRYPT' 91, Apr. 8, 1991, pp. 257-265.
Chaum, "Untraceable Electronic Mail, Return Addresses, and Digital Pseudonyms", Communications of the ACM, vol. 24, No. 2, Feb. 1, 1981, pp. 84-88.
Clausen et al., "Optimized Link State Routing Protocol (OLSR)", RFC 3626, Network Working Group, Oct. 2003, 65 pp.
Cotton et al., "IANA Guidelines for IPV4 Multicast Address Assignments", RFC 5771, Internet Engineering Task Force (IETF), Mar. 2010, 11 pp.
Damgard et al., "Multiparty Computation from Somewhat Homomorphic Encryption", Proceedings of the 32nd Annual Cryptology Conference on Advances in Cryptology, CRYPTO 2012, vol. 7417, Aug. 19, 2012, 46 pp.
Damgard et al., "Practical Covertly Secure MPC for Dishonest Majority—or: Breaking the SPDZ Limits", Proceedings of 18th European Symposium on Research in Computer Security, ESORICS 2013, Sep. 9, 2013, 18 pp.
Deering et al., "Host Extensions for IP Multicasting", RFC 1112, Network Working Group, Aug. 1989, 17 pp.
Demmler et al., "ABY—A Framework for Efficient Mixed-Protocol Secure Two-Party Computation", NDSS Symposium 2015, Feb. 2015, 15 pp.
Dodis et al., "A Verifiable Random Function With Short Proofs and Keys", Proceedings of the 8th International Conference on Theory and Practice in Public Key Cryptography, Jan. 23, 2005, p. 416-431.
Dolev et al., "Proactive Secret Sharing with a Dishonest Majority", Proceedings of the Security and Cryptography for Networks: 10th International Conference, Aug. 31, 2016, 20 pp.

(56) References Cited

OTHER PUBLICATIONS

Eldefrawy et al., "Founding Digital Currency on Secure Computation", Proceedings of the 2014 ACM SIGSAC Conference on Computer and Communications Security, CCS '14, Nov. 3, 2014, 14 pp.

Eldefrawy et al., "Proactive Secure Multiparty Computation with a Dishonest Majority", Security and Cryptography for Networks, vol. 11035, Sep. 2018, 26 pp.

Eldefrawy et al., "Proactively Secure Cloud-Enabled Storage", 2017 IEEE 37th International Conference on Distributed Computing Systems (ICDCS), Jun. 5, 2017, p. 1499-1509.

Fouque et al., "Fully Distributed Threshold RSA under Standard Assumptions", Proceedings of the 7th International Conference on the Theory and Application of Cryptology and Information Security: Advances in Cryptology, ASIACRYPT '01, Dec. 9, 2001, 18 pp.

Gascon et al., "Privacy-Preserving Distributed Linear Regression on High-Dimensional Data", Proceedings on Privacy Enhancing Technologies, Jun. 2, 2017, pp. 345-364.

Gilad et al., "Algorand: Scaling Byzantine Agreements for Cryptocurrencies", Proceedings of the 26th Symposium on Operating Systems Principles, SOSP '17, Oct. 14, 2017, pp. 51-68.

Goldberg et al., "Verifiable Random Functions (VRFs)", Crypto Forum Research Group, Sep. 14, 2018, 42 pp.

Goldschlag et al., "Onion Routing", Communications of the ACM, vol. 42, No. 2, Feb. 1999, pp. 39-41.

Henecka et al., "TASTY: Tool for Automating Secure Two-partY computations", Proceedings of the 17th ACM conference on Computer and communications security, Oct. 4, 2010, pp. 451-462.

Hirt et al., "Network-Hiding Communication and Applications to Multi-Party Protocols", Advances in Cryptology—CRYPTO 2016—36th Annual International Cryptology Conference, Aug. 14, 2016, p. 335-365.

Hofheinz et al., "Verifiable Random Functions from Standard Assumptions", Proceedings, Part I, of the 13th International Conference on Theory of Cryptography, vol. 9562, Jan. 10, 2016, pp. 336-362.

Holbrook et al., "Using Internet Group Management Protocol Version 3 (IGMPv3) and Multicast Listener Discovery Protocol Version 2 (MLDv2) for Source-Specific Multicast", RFC 4604, Network Working Group, Aug. 2006, 11 pp.

International Preliminary Report on Patentability from International Application No. PCT/US2021/041115 dated Jan. 19, 2023, 10 pp.

International Search Report and Written Opinion of International Application No. PCTPCT/US2021/041115, dated Nov. 22, 2021, 12 pp.

Invitation to Pay Additional Fees and, Where Applicable, Protest Fee from International Application No. PCT/US2021/41115, dated Sep. 22, 2021, 3 pp.

Keller et al., "MASCOT: Faster Malicious Arithmetic Secure Computation with Oblivious Transfer", Proceedings of the 2016 ACM SIGSAC Conference on Computer and Communications Security, Oct. 24, 2016, 39 pp.

Keller et al., "Overdrive: Making SPDZ Great Again", Advances in Cryptology—EUROCRYPT 2018, Lecture Notes in Computer Science, vol. 10822, Mar. 31, 2018, pp. 158-189.

Keller et al., "Reducing Communication Channels in MPC", Security and Cryptography for Networks, Lecture Notes in Computer Science, vol. 11035, Aug. 3, 2018, pp. 181-199.

Kolesnikov et al., "Efficient Batched Oblivious PRF with Applications to Private Set Intersection", Proceedings of the 2016 ACM SIGSAC Conference on Computer and Communications Security, Oct. 24, 2016, pp. 818-829.

Malkhi et al., "Fairplay—A Secure Two-Party Computation System", Proceedings of the 13th conference on USENIX Security Symposium, vol. 13, Aug. 13, 2004, 17 pp.

Micali et al., "Verifiable Random Functions", 40th Annual Symposium on Foundations of Computer Science, Oct. 17, 1999, 11 pp.

Mohassel et al., "ABY3: A Mixed Protocol Framework for Machine Learning", Proceedings of the 2018 ACM SIGSAC Conference on Computer and Communications Security, Oct. 15, 2018, 40 pp.

Moran et al., "Topology—Hiding Computation", Theory of Cryptography—12th Theory of Cryptography Conference, Jan. 1, 2015, pp. 159-181.

Nielsen et al., "A New Approach to Practical Active-Secure Two-Party Computation", Advances in Cryptology—CRYPTO 2012, vol. 7417, Aug. 2012, pp. 681-700.

Orru et al., "Actively Secure 1-out-of-N OT Extension with Application to Private Set Intersection", Cryptographers' Track at the RSA Conference, vol. 10159, Jan. 10, 2017, pp. 381-396.

Ostrovsky et al., "How To Withstand Mobile Virus Attacks", Proceedings of the tenth annual ACM symposium on Principles of distributed computing, Jul. 1, 1991, pp. 51-59.

Ratnasamy et al., "A Scalable Content-Addressable Network", ACM SIGCOMM Computer Communication Review, vol. 31, No. 4, Oct. 2001, pp. 161-172.

Rindal et al., "Malicious-Secure Private Set Intersection via Dual Execution", Proceedings of the 2017 ACM SIGSAC Conference on Computer and Communications Security, Aug. 9, 2017, pp. 1229-1242.

Rivest et al., "How to Leak a Secret", Proceedings of the 7th International Conference on the Theory and Application of Cryptology and Information Security: Advances in Cryptology, Nov. 20, 2001, pp. 552-565.

Rowstron et al., "Pastry: Scalable, decentralized object location and routing for large-scale peer-to-peer systems", IFIP/ACM International Conference on Distributed Systems Platforms and Open Distributed Processing, Oct. 31, 2001, pp. 329-350.

Saltzer, "End-To-End Arguments in System Design", M.I.T. Laboratory for Computer Science, 1981, 10 pp., (Applicant points out, in accordance with MPEP 609.04(a), that the year of publication, 1981, is sufficiently earlier than the effective U.S. filing date, so that the particular month of publication is not an issue.).

Shoup, "Practical Threshold Signatures", International Conference on the Theory and Applications of Cryptographic Techniques, vol. 1807, May 12, 2000, pp. 207-220.

Stoica et al., "Chord: A Scalable Peer-to-peer Lookup Service for Internet Applications", Proceedings of ACM SIGCOMM, vol. 31, No. 4, Aug. 27, 2001, pp. 149-160.

Wang et al., "EMP-toolkit", Retrieved from: https://github.com/emp-toolkit, Accessed on: Sep. 6, 2018, 3 pp.

Zhao et al., "Tapestry: A Resilient Global-Scale Overlay for Service Deployment", IEEE Journal on Selected Areas in Communications, vol. 22, No. 1, Jan. 2004, pp. 41-53.

Graciarena et al., "All for One: Feature Combination for Highly Channel-Degraded Speech Activity Detection", Speech & Natural Language Publications, Aug. 1, 2013, 5 pp.

* cited by examiner

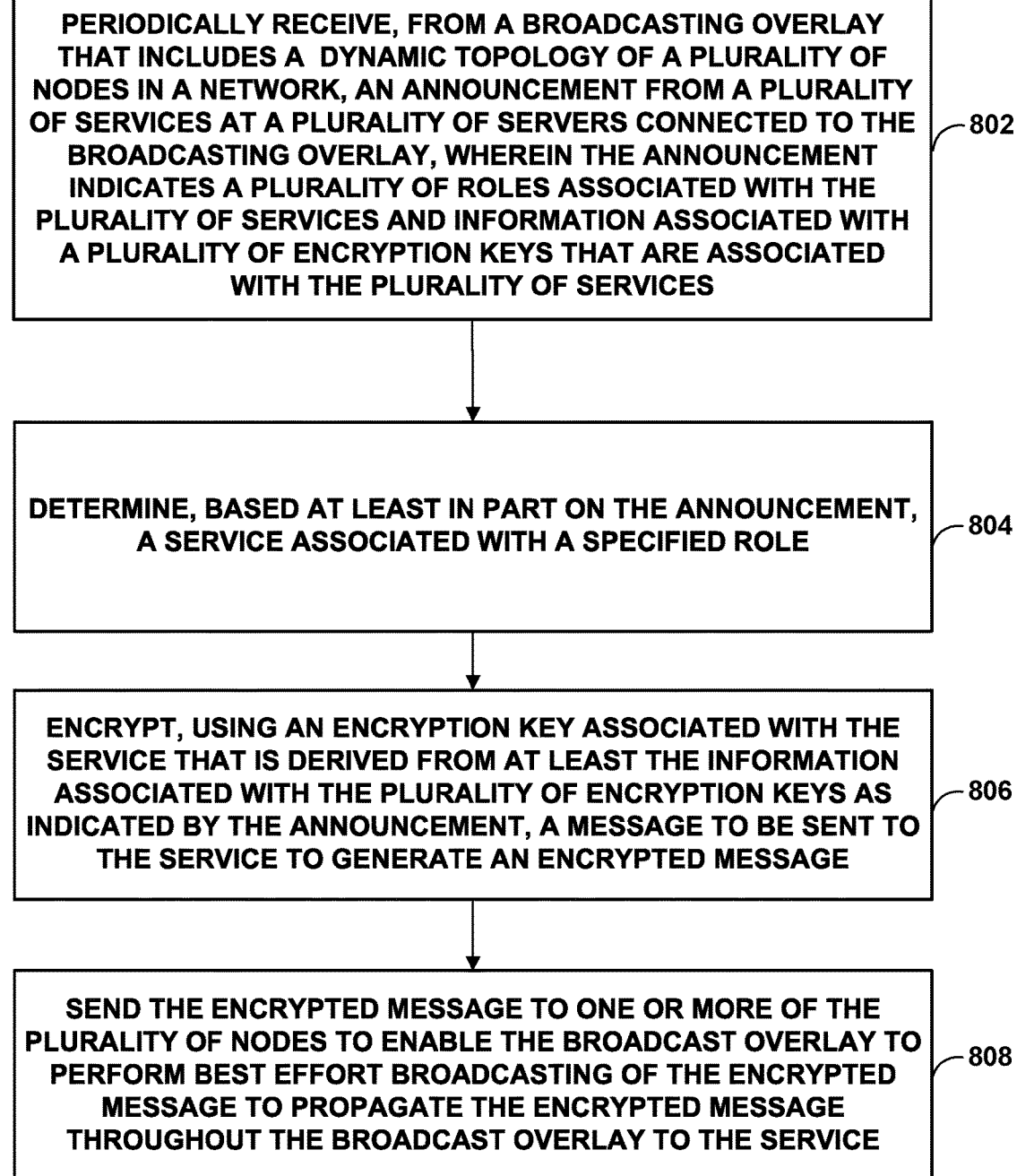

PERIODICALLY RECEIVE, FROM A BROADCASTING OVERLAY THAT INCLUDES A DYNAMIC TOPOLOGY OF A PLURALITY OF NODES IN A NETWORK, AN ANNOUNCEMENT FROM A PLURALITY OF SERVICES AT A PLURALITY OF SERVERS CONNECTED TO THE BROADCASTING OVERLAY, WHEREIN THE ANNOUNCEMENT INDICATES A PLURALITY OF ROLES ASSOCIATED WITH THE PLURALITY OF SERVICES AND INFORMATION ASSOCIATED WITH A PLURALITY OF ENCRYPTION KEYS THAT ARE ASSOCIATED WITH THE PLURALITY OF SERVICES ⟋802

DETERMINE, BASED AT LEAST IN PART ON THE ANNOUNCEMENT, A SERVICE ASSOCIATED WITH A SPECIFIED ROLE ⟋804

ENCRYPT, USING AN ENCRYPTION KEY ASSOCIATED WITH THE SERVICE THAT IS DERIVED FROM AT LEAST THE INFORMATION ASSOCIATED WITH THE PLURALITY OF ENCRYPTION KEYS AS INDICATED BY THE ANNOUNCEMENT, A MESSAGE TO BE SENT TO THE SERVICE TO GENERATE AN ENCRYPTED MESSAGE ⟋806

SEND THE ENCRYPTED MESSAGE TO ONE OR MORE OF THE PLURALITY OF NODES TO ENABLE THE BROADCAST OVERLAY TO PERFORM BEST EFFORT BROADCASTING OF THE ENCRYPTED MESSAGE TO PROPAGATE THE ENCRYPTED MESSAGE THROUGHOUT THE BROADCAST OVERLAY TO THE SERVICE ⟋808

FIG. 8

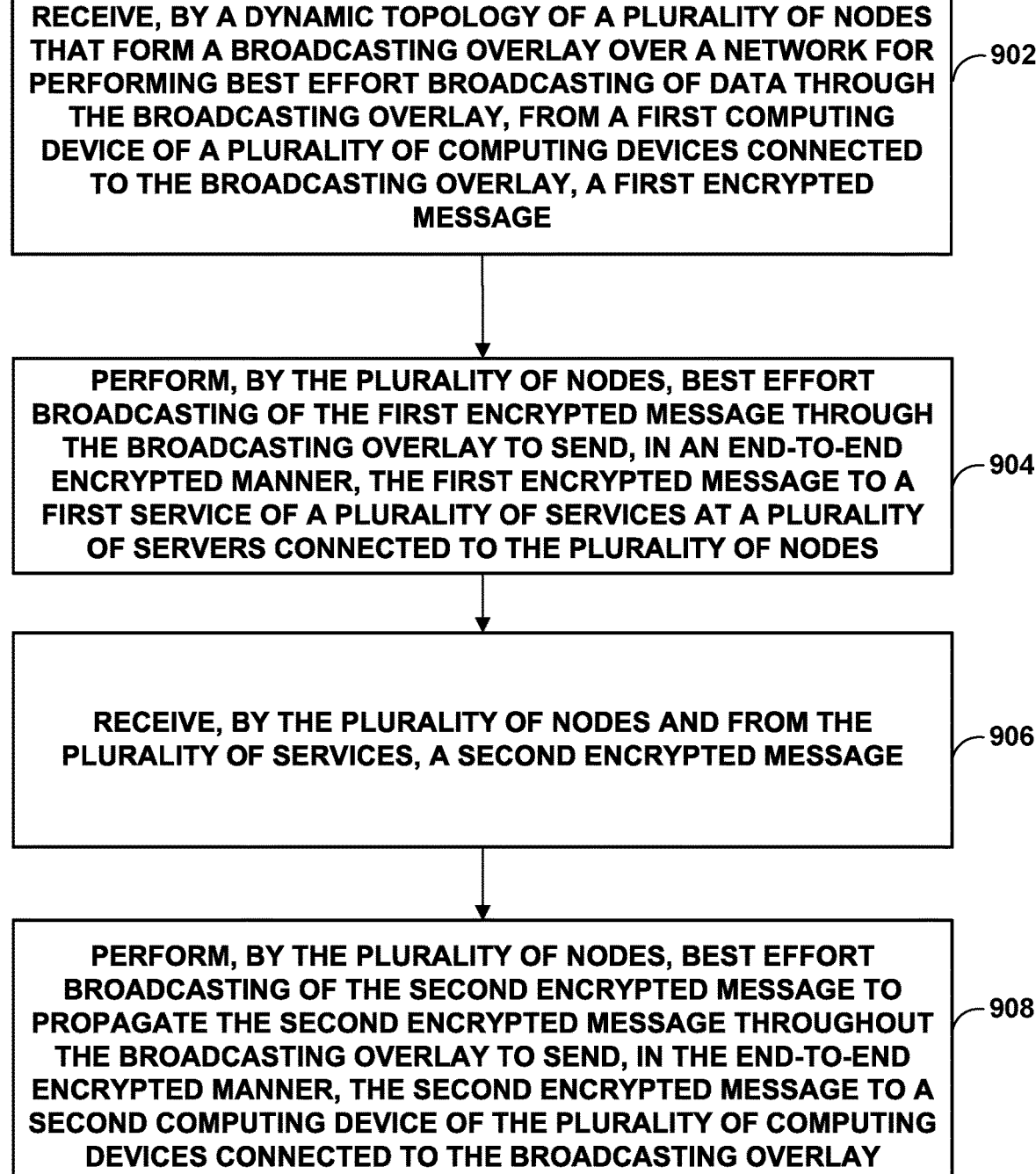

RECEIVE, BY A DYNAMIC TOPOLOGY OF A PLURALITY OF NODES THAT FORM A BROADCASTING OVERLAY OVER A NETWORK FOR PERFORMING BEST EFFORT BROADCASTING OF DATA THROUGH THE BROADCASTING OVERLAY, FROM A FIRST COMPUTING DEVICE OF A PLURALITY OF COMPUTING DEVICES CONNECTED TO THE BROADCASTING OVERLAY, A FIRST ENCRYPTED MESSAGE — 902

PERFORM, BY THE PLURALITY OF NODES, BEST EFFORT BROADCASTING OF THE FIRST ENCRYPTED MESSAGE THROUGH THE BROADCASTING OVERLAY TO SEND, IN AN END-TO-END ENCRYPTED MANNER, THE FIRST ENCRYPTED MESSAGE TO A FIRST SERVICE OF A PLURALITY OF SERVICES AT A PLURALITY OF SERVERS CONNECTED TO THE PLURALITY OF NODES — 904

RECEIVE, BY THE PLURALITY OF NODES AND FROM THE PLURALITY OF SERVICES, A SECOND ENCRYPTED MESSAGE — 906

PERFORM, BY THE PLURALITY OF NODES, BEST EFFORT BROADCASTING OF THE SECOND ENCRYPTED MESSAGE TO PROPAGATE THE SECOND ENCRYPTED MESSAGE THROUGHOUT THE BROADCASTING OVERLAY TO SEND, IN THE END-TO-END ENCRYPTED MANNER, THE SECOND ENCRYPTED MESSAGE TO A SECOND COMPUTING DEVICE OF THE PLURALITY OF COMPUTING DEVICES CONNECTED TO THE BROADCASTING OVERLAY — 908

FIG. 9

OVERLAY FOR COMMUNICATION ANONYMITY AND PRIVACY IN A COMPUTER NETWORK

CROSS REFERENCE

This application is a National Stage Entry of International Application No. PCT/US2021/041115, filed Jul. 9, 2021, which claims the benefit of U.S. Provisional Patent Application No. 63/050,274, filed on Jul. 10, 2020, each of which is incorporated herein by reference in its entirety.

GOVERNMENT RIGHTS

This invention was made with Government support under Contract No. FA8750-19-C-0502 awarded by the United States Air Force and The Defense Advanced Research Projects Agency. The government has certain rights in the invention

TECHNICAL FIELD

This disclosure relates to secure, anonymous, and privacy-preserving communication over a network using a network overlay.

BACKGROUND

Increasingly, entities such as governments and other organizations are attempting to assert control of Internet communications by blocking, filtering, or otherwise censoring content on the Internet. For example, governments and organizations may block certain websites or Internet-based services from being accessed or may censor messages that contain politically sensitive, offensive, or other content. Some users may attempt to circumvent such blocking, filtering, and censorship of content by using services such as virtual private networks (VPNs) that foster anonymity and privacy, but such services may not necessarily be resilient against blocking, filtering, and censorship.

SUMMARY

In general, this disclosure describes techniques for an anonymizing, obfuscating, and flooding overlay that provides for secure, anonymous, privacy-preserving, and censorship-resilient communication over a network, such as the Internet. The overlay may provide best effort broadcasting of end-to-end encrypted messages among computing devices and services in the network to preserve the anonymity and privacy of users that send and receive messages using the overlay while preserving the security of such messages and preventing entities from attempting to block the sending and receiving of such messages.

In one example, a method includes periodically receiving, by a computing device associated with a user and from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services; determining, by the computing device and based at least in part on the announcement, a service associated with a specified role; encrypting, by the computing device and using an encryption key associated with the service that is derived from at least the information associated with the plurality of encryption keys as indicated by the announcement, a message to be sent to the service to generate an encrypted message; and sending, by the computing device, the encrypted message to one or more of the plurality of nodes to enable the broadcasting overlay to perform best effort broadcasting of the encrypted message to propagate the encrypted message throughout the broadcasting overlay to the service.

In another example, a computing device includes a memory; and processing circuitry operably coupled to the memory and configured to: periodically receive, from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services; determine, based at least in part on the announcement, a service associated with a specified role; encrypt, using an encryption key associated with the service that is derived from at least the information associated with the plurality of encryption keys as indicated by the announcement, a message to be sent to the service to generate an encrypted message; and send the encrypted message to one or more of the plurality of nodes to enable the broadcasting overlay to perform best effort broadcasting of the encrypted message to propagate the encrypted message throughout the broadcasting overlay to the service.

In another example, a computer-readable storage medium storing instructions that, when executed by one or more processors, cause the one or more processors to: periodically receive, from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services; determine, based at least in part on the announcement, a service associated with a specified role; encrypt, using an encryption key associated with the service that is derived from at least the information associated with the plurality of encryption keys as indicated by the announcement, a message to be sent to the service to generate an encrypted message; and send the encrypted message to one or more of the plurality of nodes to enable the broadcasting overlay to perform best effort broadcasting of the encrypted message to propagate the encrypted message throughout the broadcasting overlay to the service.

In another example, a system includes a plurality of services at a plurality of servers; and a dynamic topology of a plurality of nodes connected to the plurality of servers that form a broadcasting overlay over a network for performing best effort broadcasting of data through the broadcasting overlay, wherein the plurality of nodes are configured to: receive, from a first computing device of a plurality of computing devices connected to the broadcasting overlay, a first encrypted message; perform best effort broadcasting of the first encrypted message through the broadcasting overlay to send, in an end-to-end encrypted manner, the first encrypted message to a first service of the plurality of services at the plurality of servers connected to the plurality of nodes; receive, from the plurality of services, a second encrypted message; and perform best effort broadcasting of the second encrypted message to propagate the second encrypted message through the broadcasting overlay to send, in the end-to-end encrypted manner, the second encrypted message to a second computing device of the plurality of computing devices connected to the broadcasting overlay.

In another example, a method includes receiving, by a dynamic topology of a plurality of nodes that form a broadcasting overlay over a network for performing best effort broadcasting of data through the broadcasting overlay, from a first computing device of a plurality of computing devices connected to the broadcasting overlay, a first encrypted message; performing, by the plurality of nodes, best effort broadcasting of the first encrypted message through the broadcasting overlay to send, in an end-to-end encrypted manner, the first encrypted message to a first service of a plurality of services at a plurality of servers connected to the plurality of nodes; receiving, by the plurality of nodes and from the plurality of services, a second encrypted message; and performing, by the plurality of nodes, best effort broadcasting of the second encrypted message to propagate the second encrypted message throughout the broadcasting overlay to send, in the end-to-end encrypted manner, the second encrypted message to a second computing device of the plurality of computing devices connected to the broadcasting overlay.

In another example, a computer-readable storage medium storing instructions that, when executed by one or more processors of one or more of a plurality of nodes that form a broadcasting overlay over a network for performing best effort broadcasting of data through the broadcasting overlay, cause the one or more processors to: receive, from a first computing device of a plurality of computing devices connected to the broadcasting overlay, a first encrypted message; perform best effort broadcasting of the first encrypted message through the broadcasting overlay to send, in an end-to-end encrypted manner, the first encrypted message to a first service of a plurality of services at a plurality of servers connected to the plurality of nodes; receive, from the plurality of services, a second encrypted message; and perform best effort broadcasting of the second encrypted message to propagate the second encrypted message throughout the broadcasting overlay to send, in the end-to-end encrypted manner, the second encrypted message to a second computing device of the plurality of computing devices connected to the broadcasting overlay.

The details of one or more examples are set forth in the accompanying drawings and the description below. Other features, objects, and advantages will be apparent from the description and drawings, and from the claims.

BRIEF DESCRIPTION OF DRAWINGS

FIG. 8 is a flowchart illustrating an example mode of operation for a computing device to use an overlay to securely communicate with services and computing devices, in accordance with aspects of the present disclosure.

FIG. 9 is a flowchart illustrating an example mode of operation for nodes of a broadcasting overlay to broadcast end-to-end encrypted messages, in accordance with aspects of the present disclosure.

DETAILED DESCRIPTION

Figure 1:
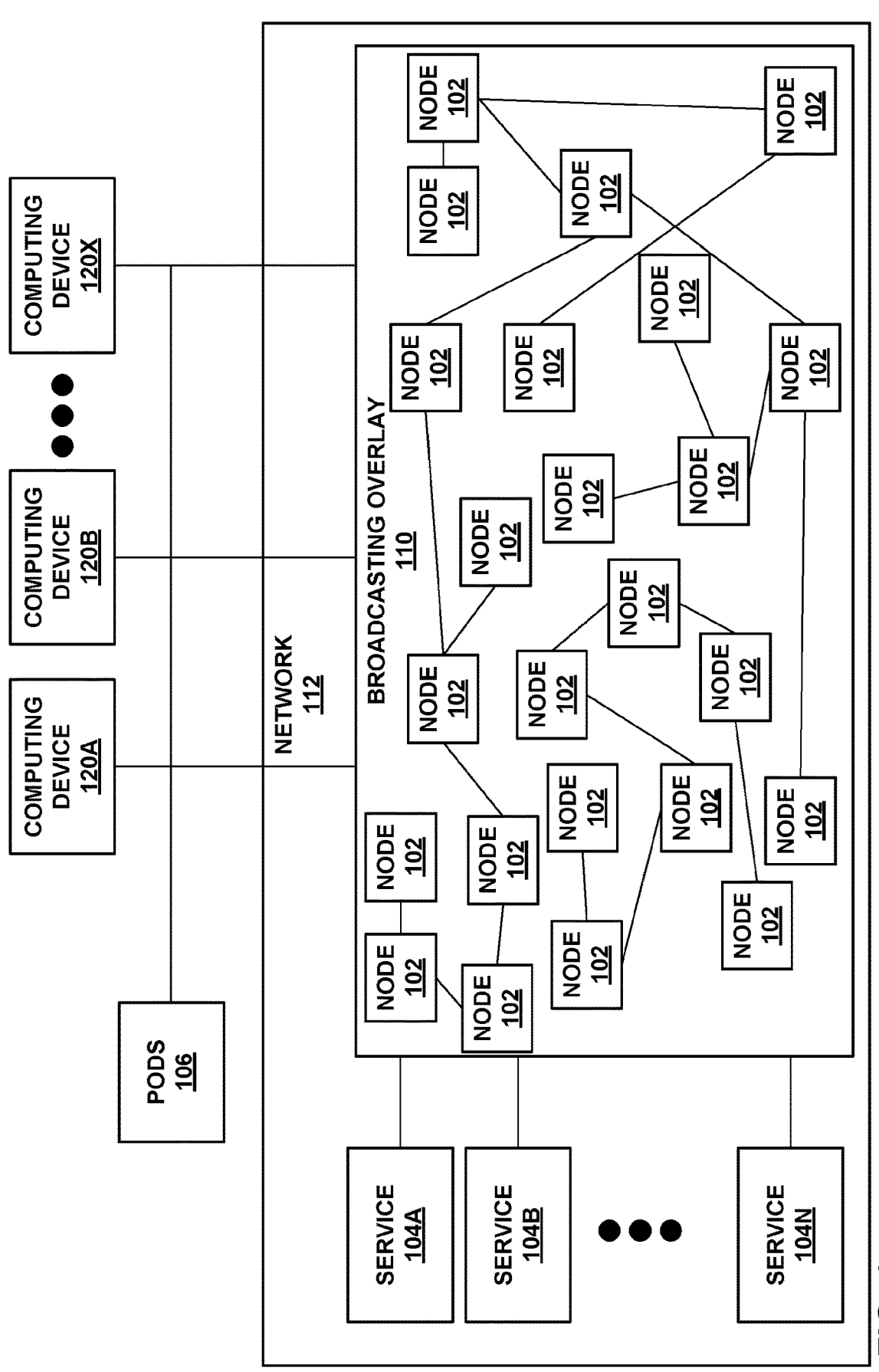
FIG. 1 is a block diagram illustrating an example environment, in accordance with aspects of the present disclosure.

In general, this disclosure describes techniques for an anonymizing, obfuscating, and flooding overlay that provides for secure, anonymous, privacy-preserving, and censorship-resilient communication over a network, such as the Internet. The overlay may provide best effort broadcasting of end-to-end encrypted messages between computing devices and services in the network to preserve the anonymity and privacy of users that send and receive messages using the overlay while preserving the security of such messages and preventing entities from attempting to block the sending and receiving of such messages.

The Internet's original Transmission Control Protocol (TCP)/Internet Protocol (IP) point-to-point/client-server design did not necessarily consider security, privacy, anonymity, and censorship-resistance in its design. The design also did not foresee the magnitude of privacy-sensitive communication and applications to be run on the Internet, nor did it foresee large-scale eavesdropping and censorship attempts by entities such as governments, organizations, malicious attackers, and others. Current confidentiality, security, and privacy-ensuring solutions (e.g., encryption) do not necessarily provide solutions to these potential issues, which may often require more than patches. A new design model that addresses these goals, that is easy to deploy and operate, and that can interface with existing applications and infrastructure is described herein.

Currently, techniques such as virtual private networks (VPN) and Onion Routers (e.g., as part of a Tor network) are used to facilitate security and privacy when communicating over a network. VPNs are typically operated at centralized servers with well-known IP addresses that can be enumerated and thus efficiently censored/filtered/blocked. In addition, VPNs may not scale with the addition of new users in the system, and it may not be possible for VPNs to leverage peer-to-peer mechanisms to route around blocked IPs. Furthermore, VPNs may only work only with IP traffic and do not help with protecting the privacy of user data from online application and service providers.

Tor uses a centralized directory service that lists all of the Tor routers and gateway in a public file and is therefore easy to block and/or filter. That is, Tor can be easily blocked because of the public nature of its directory service. Like VPNs, Tor does not help protect the privacy of user data from online application and service providers. Tor also does not enable users to use a personalized gateway that is dedicated to the users. Furthermore, the Tor infrastructure is relatively static and does not exhibit a high level of distribution dynamicity as the methods and systems described below. In contrast, the techniques of the present disclosure may enable each user, in theory, to have their own dedicated gateway, and users may allow their contacts to route traffic through the dedicated gateway. Accordingly, a system and method is disclosed to enhance privacy and anonymity of users' use of a network, such as the Internet.

Anonymizing Obfuscating Flooding Overlay

Disclosed are systems involving multiple components that include an anonymizing obfuscating flooding overlay, hereinafter referred to as "the flooding overlay". The flooding overlay may be a software-based distributed obfuscation overlay with no single point of failure or trust (often called zero trust in the literature), and it can be deployed on existing IP infrastructure to make the infrastructure disruption-tolerant with end-to-end guarantees on secrecy, authenticity, and integrity.

Specifically, the flooding overlay may provide one or more of the following features:

Zero Trust: No single in-network component generates or stores user encryption keys, no single component in the overlay constitutes a single point of failure/attack.

Traffic Obfuscation: Distributed stateless oblivious forwarding that obfuscates traffic because forwarding-behavior is independent of traffic type or amount.

Disruption Tolerance: Overlay is accessible all over the Internet, and getting traffic to a single node (e.g., via anycast, or P2P forwarding if experiencing a blocked or disrupted connection) may ensure that traffic can get to any other node in the overlay.

Secrecy: No single overlay entity has encryption keys. End-to-end (E2E) traffic secrecy may be ensured via Identity Based Encryption (IBE)-like or similar encryption schemes without key escrow, and hop-by-hop encryption via ephemeral keys.

Security (Authenticity & Integrity): Authenticity and integrity of traffic verified at customer's end-nodes via E2E IBE-like encryption and digital signatures.

The techniques of this disclosure may solve existing technical problems with solid mathematically backed arguments for claimed security, privacy, anonymity, and censorship-resistance guarantees, and enables quick and easy development of privacy-preserving and censorship-resistant versions of several online services and applications (e.g., messaging, sharing of multimedia, email, cloud storage, un-trackable usage of tracking search engines, etc.). Accommodating diverse services and applications may illustrate the flooding overlay's flexibility and viability as a long-term solution.

The flooding overlay can be incrementally deployed as a software-only overlay on public clouds and can quickly scale with user demand by adding more virtual worker servers to the overlay core. The flooding overlay can leverage tech-savvy users willing to configure their cloud systems (or other systems) to be part of the overlay. A use case can be based on developing and operating freemium-based privacy-preserving online services and applications for messaging, sharing of multimedia, email, cloud storage, un-trackable usage of tracking search engines.

The flooding overlay system may include an overlay architecture and system can combine one or more of the following components: 1) an anonymous resilient best-effort forwarding core, 2) a Pseudonym Offline Directory Service (PODS), and 3) Privacy-preserving Overlayed Secure Transports and Services (POSTS). The Anonymous Resilient Best-Effort Forwarding Core comprises: (i) an Overlayed Personalizable Anonymous Communication and User Environments (OPACUE) and (2) a Best-Effort Broadcasting overlay (BEBO) that is hard to censor/filter. PODS can be implemented using Identity-based Encryption (IBE) or IBE-like encryption. POSTS leverages the core and PODS by interfacing servers implementing the desired application to the OPACUE/BEBO.

OPACUE is an overlay transport that can be utilized to get to a service, such as a POSTS. In an example, POSTS may be a secure storage service. In another example, POSTS maybe another type of storage service. PODS may be useful in registering a user to send and receive messages through the overlay.

Descriptive Terms

Certain descriptive terms are described herein:
ID: a string representing an Identity of a user or service, i.e., a methodology to address a logical end point in the overall system at the (application) layer the system is operating at
TCP: Transmission Control Protocol
TLS: Transport Layer Security
SSL: Secure Socket Layer
NAT Network Address Translation/Translators
IP: Internet Protocol
VPN: Virtual Private Network
PCS: Ping and Calibration Service
UDP: User Datagram Protocol Cloud-based Anonymous and Privacy-assisting Personal Proxy Environment (CAPE)

Another aspect of this disclosure includes systems and methods to automatically assign and configure custom/personalized proxy and gateway servers to assist users' computing platforms (e.g., smartphones, tablets, laptops, or PCs) to circumvent blocking/filtering and censorship in networks where heavy traffic analysis and/or filtering/blocking/censorship is implemented. In other words, disclosed is a Cloud-based Anonymity and Privacy-assisting Personal Proxy Environment. In addition to avoiding censorship, another benefit is to enhance privacy and anonymity of users' usage of the Internet, preventing their local and/or other ISPs and network operators from eavesdropping on their browsing patterns and destinations, or in general traffic patterns and destinations. ISPs today can see which websites their customers are visiting (even if traffic is encrypted end-to-end between users and the websites). While more technically savvy users can use VPNs and Tor (described above), those technologies still use, in both cases, infrastructure that is centralized and thus easier to enumerate and block/filter.

CAPE, together with an overlay network technology such as flooding overlay, can also enable quick and easy development of privacy-preserving versions of several of today's online services such as: untraceable use of search engines, secure and anonymous and censorship-resistant messaging and sharing, secure and privacy-preserving and anonymous cloud-based storage of data.

Users may include consumers (e.g., individuals) or users in an enterprise, and in one example, several users may be using the same personal gateways and proxy servers that were set up. The assignment and configuration of personal gateways and proxy servers may occur automatically through a user's mobile app, web interface, or any similar means such as browser plugin, and may be performed in an end-to-end (E2E) encrypted manner. One way this is achieved is by tunneling the very first unblocking requests to set up such servers from a censored network through an anonymizing obfuscating flooding overlay network, such as flooding overlay, that enables anonymous and privacy-preserving communication. The setup and configuration of such personal gateways and proxy servers can also occur when the user is outside the censored network.

The virtual infrastructure is distributed and has no single point of failure, and is therefore difficult to take down, enumerate, filter, and/or block. The virtual infrastructure described in this disclosure may be software-based, can be deployed as an overlay network on the current Internet, and is dynamic and continuously self-configuring and shifting, thereby implementing a moving-target defense against attacks that could be launched on it by oppressive governments or ISPs and other carriers that implement filtering/blocking/censorship. While the use cases and operational details in terms of a single logical individual/user with multiple devices, the users herein, as well as apps/software on their behalf, can be a device in an Internet of Things (IoT) setting or other similar settings.

In one example, the mobile app of a requesting user (U) may request a dedicated individual (physical or logical) proxy gateway server to forward U's traffic to the rest of the Internet in ways that would not be easy to detect, block, censor, and/or filter. The description below details how this can be performed in accordance with the techniques of this disclosure.

Operation of CAPE

In one example, in a first step, an ID is set up that can be an endpoint for a form of messaging using any overlay network that fits certain parameters, including the flooding overlay as described above. This ID may act as a way to reach a service that acts a Proxy SetUp REQuest (PSU__REQ) Fulfiller (PSUFUL). This ID may be hard-coded in a user U's overlay network (e.g., the flooding overlay) mobile app. PODS may be utilized in setting up an ID. PSUFLU is a service that is connected to OPACQUE that satisfies users' requests.

In a second step, U's app sends a PSU_REQ with its (U's) current IP address and port number or dropbox (which can also be an ID associated with any online storage) to a remote flooding overlay POSTS that PSUFUL periodically polls to receives such requests and acts on them.

In a third step, once PSUFUL gets U's PSU_REQ it will decrypt it and see the request in the clear (decryption can be similar to how occurs in an overlay network or the flooding overlay). PSUFUL may act on this request by setting up a Proxy Backend (PB) to interface to the rest of the Internet and set up a sequence of Proxy Frontends (PF) with unique IPs (and/or ports) to which U's app can use to send traffic. The combination of PB and PF may be what is referred to as "CAPE." In different examples, one container/server can act as both PB and PF, then separate containers/servers can act as PB and PF, then separate containers/servers can act as PB and multiple PFs. Backend and frontend terminology is with respect to the user U's direction. For instance, the frontend faces U. In different examples, aspects of CAPE can be in the cloud or be in a certain location on a network.

In a fourth step, U's app then sets up tunnels using standard TLS/SSL to the CAPE (e.g., to PF which forwards traffic to PB) to forward traffic to the rest of the Internet. Separating PB and PF may enable PB to keep up standard TCP/TLS/SSL connections to webpages/websites or other online services, while U's app may tunnel traffic through different PFs to avoid blocking at a very high rate (e.g., change the PFs per minute or hour).

In one example, there is a seamless hand-off of the connection from PF to PF. Although there are many ways to do this, one way is to have each PF have a continuous TCP/IP connection to BF and use standard techniques used in NAT or mobile IP to keep such connections going. This is practical since TCP/TLS/SSL may operate on top of IP, such as by tunning IP (to PB) in IP (to PF).

Deployment Scenarios

In one example where there is an overlay network, such as the flooding overlay, that is deployed on top of the existing Internet, the CAPE may be deployed in the cloud and may communicate to the rest of the Internet either via the overlay network and/or directly with the rest of the Internet. In another example, CAPE can also work alone and be used as a personal VPN. The new user (U) may use an appropriate mobile application that implements a user interface. U may also have an account with a public or local cloud hosting provider (CHP). A CHP implementing the techniques of this disclosure may be a virtual provider administered by an operator to provide a VPN-like service but with enhanced privacy, anonymity, and censorship resistance. The CAPE described herein may inherently have a much higher degree of distribution compared with VPNs because users may have their own gateways and proxies in accordance with aspects of this disclosure.

Operation and Setup of CAPE

In step one, a Cloud-based Anonymity and Privacy-assisting Personal Proxy Environment (CAPE) can be automatically set, via automated scripts, in cloud provider of choice (inside country, or remote in another country, where the user is, etc.). This setup can be initiated from mobile app, web-interface, or browser plugin.

In step two, the new user chooses if their contacts (or a subset of them) can use the new user's CAPE or not. In another example, this step may be ignored in an enterprise use case where an employee is a part of an organization, and the employee can be considered a contact in the organization.

If the new user chooses YES, then the contacts can use new user's CAPE. In an intermediate step, send the contacts (e.g., to the contacts' mobile app for the flooding overlay, in email, SMS, or any other channels) an automatic message with IP address and port numbers, and/or public encryption keys (e.g., a Diffie-Hellman half-key as in the overlay network), of new user's CAPE. In one example, a link may be sent that allows the contact to open the app for the flooding overlay on their mobile device.

If the new user chooses YES or NO (both cases), CAPE then tries to connect to the BEBO, and a ping calibration service (PCS) may measure delays and the blockage/filtering/censorship state of the connection to the BEBO. CAPE can obtain some details of BEBO entry points from a contact/friends' apps once the CAPE invite/request above is sent to them, they can respond to new user's CAPE. If the connection to BEBO is OK, then the system will wait to get user traffic and keep polling BEBO-based DHOPBOX or similar services. If the connection to BEBO is NOT OK, the system will try to use (go through) the contact/friends' CAPE to get to an OK state of communication through BEBO. If the system cannot get to OK state, the system will timeout and inform the user.

In one example, an enterprise version could (or should) have the enterprise have several already set-up CAPEs to help employees everywhere in the world access the Internet and their home services without the risk of being easily filtered/censored.

The CAPE may be dynamic and may continuously (e.g., per day) change the IP addresses and ports to make enumerating the CAPE and blocking the CAPE much more difficult without also incurring significant collateral damage by blocking/filtering a large space of IP addresses and ranges.

Best Effort Broadcasting Overlay (BEBO)

Currently, there is no overlay network or application, or any part or sub-network of the current Internet that enables an entity or application/software on their behalf to broadcast messages to all nodes in such an overlay network or sub-network. One technique includes flooding functionality in an overlay network comprising the backbone of a blockchain-based cryptocurrency such as Bitcoin. However, even structured or unstructured peer-to-peer (P2P) networks do not perform such best effort broadcasting functionality that could scale to a global scale as the techniques described in this disclosure. More details on the potential issues associated with existing methodologies are provided below.

IP-based Broadcast

The Internet Protocol (IP) that forms as the foundation of addressing and routing on the Internet today (both version v4 and v6) has in its design a native broadcasting functionality. For example, to broadcast a message to the subnetwork with the IP prefix A.B.C, an entity can send an IP packet to A.B.C.255. In theory the entity can send a broadcast message to the entire IPv4 space by sending a message to 255.255.255.255, but in practice this does not work.

One issue with IP-based broadcasting is that broadcasting at the network/internet/IP layer of the TCP/IP protocol stack does not scale. There is a lot of control traffic at the network/internet/IP layer when broadcast is implemented in the IP layer, and IP-based broadcasting may not scale as well as if implemented (and deployed) in an overlay network.

IP-based Multicast

IP multicast is a method of sending IP datagrams to a group of interested receivers in a single transmission. It is the IP-specific form of multicast and is used for streaming media and other network applications. It uses specially reserved multicast address blocks in IPv4 and IPv6.

Protocols associated with IP multicast include internet Group Management Protocol (IGMP), Protocol Independent Multicast, and Multicast/VLAN Registration. IGMP snooping is used to manage IP multicast traffic on layer-2 networks. IP multicast is described in RFC 1112 (https://tools.ietforg/html/rfc1112). IP multicast specifications have been augmented in RFC 4604 (https://tools.ietf.org/html/rfc4604) to include group management and in RFC 5771 (https://tools.ietf.org/html/rfc5771) to include administratively scoped addresses.

Both types of IP-based broadcast/multicast techniques reveal the source of the broadcast/multicast, require support from ISPs and core routers at layer 3 (the network layer, or IP in the TCP/IP stack). These two types of IP-based broadcast/multicast techniques also do not make it easy to implement end-to-end (E2E) encryption for better privacy and anonymity.

Flooding in Blockchain

Bitcoin was the first blockchain-based system to use an overlay network that constitutes the backbone of the entire system. In Bitcoin (and most similar blockchain-based cryptocurrency systems) a user's wallet knows the IP addresses (and ports) of some nodes in this overlay and it sends transactions to some of these nodes. These nodes then flood these transactions to all the nodes they know. So essentially this is a flat overlay—it may not accommodate a hierarchy. The overlay also may only flood Bitcoin transactions and may not be used to other forms of messaging.

The techniques of this disclosure provide a more generic broadcasting overlay that can be used for different types of traffic. The techniques of this disclosure can also be used to carry cryptocurrency traffic and similar transactions, but overlays designed for carrying cryptocurrency traffic may not be able to perform the techniques of this disclosure. The overlay described herein can be a self-organizing scalable best effort (uniform) broadcasting overlay network that operates using decentralized fault-tolerant algorithms and protocols. A broadcasting functionality implemented through an overlay as outlined in this disclosure can enable several applications, starting from acting as the scalable Best Effort Broadcasting Overlay (BEBO) in an overlay architecture, such as the flooding overlay, or other overlay architectures.

ISPs today may be able to view data traffic of the ISPs' customers, including the source and destination IP addresses and ports. Analyzing such information enables ISPs to infer information about the users and their Internet usage habits. Websites, online services, and search engines that users use can also typically see such source and destination IP addresses and ports.

The techniques of this disclosure may help preventing ISPs, abusive and suppressive governments and organizations from obtaining such information and prevents them from effectively (and easily) inferring a lot of information about the users and their Internet usage habits. This is because the BEBO can be used by users' software/clients (on their mobile or similar personal platforms) for control and signaling/control traffic to set up two (or more) private communication channels via personal proxies and gateways. Because the BEBO may indiscriminately flood/broadcast traffic, and because traffic is encrypted, it may be extremely hard for an ISP or surveilling governments, organizations, or entities cannot track users' traffic on the BEBO.

Broadcasting in the context of this disclosure may mean that any messages sent to such an overlay are spread throughout the entire overlay network and eventually reach all nodes currently connected to said overlay network The broadcasting is uniform because the behavior of nodes when forwarding/broadcasting messages sent to his overlay may be the same and independent of the traffic type and/or amount.

This type of broadcasting-based relaying and forwarding of traffic so that it reaches all the nodes in an overlay network is sometimes called flooding in Internet(working) and computer networking literature. Best effort in broadcasting in the context of the techniques of this disclosure may mean that the overlay network may attempt its best to deliver the messages sent to it to all the nodes currently connected to the overlay network, but best effort does not offer any guarantees on delivery, in order delivery, delivery within certain delays and with certain bounds on jitters, nor guarantee a certain available communication and networking bandwidth. Such relaxed and loose delivery (delay and bandwidth) guarantees render the technical challenges facing the design, implementation, and operation of such a scalable Best Effort Broadcasting Overlay (BEBO) a solvable challenge. Requiring guaranteed delivery of messages, with high quality of services (QoS) on delay, jitter, and bandwidth is very challenging task and unlikely to be able to easily scale (to cover the entire globe) to the same levels as the design in this disclosure can with the guarantees aspired to by the BEBO design.

Such a larger overlay that BEBO can be plugged into enables obfuscated anonymous forwarding of messages. One can use such obfuscated anonymous forwarding of messages functionality to instantiate several anonymous and privacy-preserving applications such as messaging, email, cloud-based storage, untraceable access to search engines, hidden anonymous online services, customizable and/or personalizable virtual private network gateway, and several other applications and services. A BEBO can be the core building block of such an overlay architecture by implementing the core of such an overlay such that any message that reaches any node in BEBO reaches the rest of the nodes in BEBO and thus the larger overlay with high probability since BEBO may do its best effort to deliver traffic without guarantees. Thus, BEBO also serves as an enabler for all the anonymous and privacy-preserving applications that can be enabled by such a larger overlay such as messaging. email, cloud-based storage, untraceable access to search engines, hidden anonymous online services, customizable and/or personalizable virtual private network gateway.

Bootstrapping the BEBO/Overlay

In bootstrap step 1, the initial set of Seed BEBO Nodes (SBN) are deployed on different clouds or as standalone provisioned servers. Each node in SBN is supplied with a large enough subset of IP addresses (or hostnames) and TCP and/or UDP port numbers of the other SBNs. This subset could be chosen randomly from the SBN, or could be chosen to ensure a certain graph structure between the nodes, such as to ensure enough redundant paths and connections between every pair of nodes.

In bootstrap step 2, each node (i) in the set of SBN sends a BEBO-ping to every node in a set of x (configurable parameter) of SBN (j) and if they reply, the two nodes (and i and j) become BEBO neighbors. Periodically (e.g., every 5 minutes), each node i sends a new BEBO heartbeat message to its neighbors to ensure that the link to node j is still working as expected.

In bootstrap step 3, if a node i sends a BEBO-ping to another node j and node j does not reply before a timeout (e.g., t=1 second), then node i marks node j as unavailable for a certain period. Node i can also attempt to retransmit the BEBO-ping for a certain number of times and increase the timeout t, such as by trying to retransmit the BEBO-ping 3 times and doubling the timeout period at each retransmission.

In bootstrap step 4, when nodes become neighbors, the nodes may exchange a fraction (y) of the (IPs, TCP and/or UDP ports of their) neighbors and BEBO-nodes they know about.

Continuous Maintenance (and Re-Organization)

For maintenance step 1, Nodes continuously (e.g., every hour) perform bootstrap step 3 and bootstrap step 4, and these steps comprise the continuous maintenance and re-organization of the BEBO.

For maintenance step 2, nodes may periodically (e.g., every day) drop a set of d (e.g., d=2 or d=3, depending on the number of neighbors) nodes from its current neighbors, where the set of d nodes may be randomly selected, and may select another set of random nodes The set of random nodes may include nodes having information that was previously received by the node from the node's neighbors.

Nodes Joining

In join step one, when a node joins the BEBO, the node may obtain a set of BEBO addresses (A) though out of band means, (e.g., from a local website or from a collection of nodes that the administrator knows about). The joining node may execute the techniques of bootstrap step 2, bootstrap step 3, and bootstrap step 4 by performing these techniques with the obtained set of BEBO nodes A.

Nodes Dropping Out

Scenario-1 (SUDDEN DROPOUT): A node could drop out of the BEBO at any point without contacting any other BEBO nodes or neighbors. Such a process of dropping out from the BEBO is referred to as a sudden/stateless drop out. A sudden dropout may occur because of a hardware, software, or hybrid local or network failure.

Dropout-Step-0: If the node's hardware and/or software crashes, then there's no local logic to be executed.

If the node stops receiving any BEBO-heartbeats, pings, or any traffic, it can determine that a neighbor has dropped out. The node may enter a dropped-out state and may keep monitoring data traffic until the receives BEBO-related data and/or control messages.

Scenario-2 (GRACEFUL DROPOUT): This occurs when/if a node does not perform a sudden drop out but determines for some reason (e.g., triggered by an administrator) that it will drop out Such a process of dropping out from the BEBO is referred to as a graceful/stateful drop out.

Dropout-Step-1: A node that is dropping out can send a BEBO-dropout message to its neighbors. The neighbors can then select the next viable node to be a neighbor from the list of nodes they have heard about (this list may be obtained from the Bootstrap-Step-4 and may also be periodically performed during maintenance).

Recovering from a Catastrophic Network Failure

A catastrophic network failure is a failure that takes out a large number of the BEBO nodes offline, and may result in a network that is segmented (i.e., the network is partitioned into disconnected/partitioned components).

Recoveiy-Step-1: Eventually, when the underlying network regains connectivity, nodes will reestablish connections to old neighbors, or new random neighbors and the components. This may automatically occur as a byproduct of executing Maintenance-Step-1 in continuous maintenance.

Scalability of the BEBO Network

The techniques of this disclosure may be used to signal and/or control traffic to set up two or more communication channels via personal proxies and gateways that the user may control. Such signaling/control traffic may not be as frequent or as large as the actual data traffic, e.g., video and/or voice communication. As such, the current design may scale well with increases to the number of nodes in the BEBO.

Further, given that the BEBO does not promise any quality of services (QoS) on delay, jitter, and bandwidth, the BEBO can scale to as many numbers of nodes, and the clients or servers connecting to the BEBO and sending traffic to the BEBO may adapt and implement the any potentially necessary mechanisms to handle any potential delay with the best effort nature of the BEBO.

One more idea to scale the BEBO is to implement a selection functionality such as the Multi-Point Relay (MPH) one in routing protocols (such as the Optimized Link State Routing, OLSH) used in P2P wireless mobile ad-hoc networks (MANETs). In this case BEBO nodes will periodically (e.g., every 5 minutes) send additional control messages announcing their neighbors, and using such neighbor information, each node in the BEBO will select a couple of its neighbor nodes as MPRs and only those MPRs may forward traffic, so the overall amount of broadcast traffic in the BEBO may be reduced compared with flooding the BEBO.

The algorithms for selecting MPR nodes when adopted in BEBO works in two main steps. Step 1 is selecting the first-hop neighbors that cover isolated second-hop neighbors. Step 2 is selecting additional first-hop neighbors based on maximum coverage criteria. The algorithm stops when all second-hop neighbors are covered.

FIG. 1 is a block diagram illustrating an example environment, in accordance with aspects of the present disclosure. As shown in FIG. 1, broadcasting overlay 110 is an overlay network that is layered on top of network 112 to implement an overlayed personalizable anonymous communication and user environment (OPAQUE) that enables computing devices 120A-120X ("computing devices 120") to communicate with services 104A-104N ("services 104") in ways that preserves the anonymity and privacy of the users of computing devices 120. In some examples, broadcasting overlay 110 may be a distributed obfuscation overlay implemented in software on one or more computing devices with no single point of failure or trust (i.e., zero trust), such as a best effort broadcasting overlay (BEBO). The BEBO can be deployed on existing Internet Protocol (IP) infrastructure, such as network 112, so that the BEBO may be disruption-tolerant while providing end-to-end guarantees on secrecy, authenticity, and integrity. Broadcasting overlay may implement at least some aspects of the flooding overlay.

Computing devices 120 may connect to broadcasting overlay 110, such as via network 112, to send and receive messages through broadcasting overlay 110 to services 104. For example, each of computing devices 120 Examples of computing devices 120 may include smart phones, laptop computers, desktop computers, tablet computers, wearable computing devices, or any other suitable computing devices.

Broadcasting overlay 110 includes a dynamic topology of nodes 102, which may include any combination of computing servers, cloud-based computing systems, network devices, and other computing devices in network 112 that each perform the functionality of one or more nodes of nodes 102. The dynamic topology of nodes 102 in broadcasting overlay 110 may change over time as one or more of nodes 102 are dropped from broadcasting overlay 110 and one or more new nodes are added to broadcasting overlay 110.

In the example where broadcasting overlay 110 is a BEBO, nodes 102 of broadcasting overlay 110 may perform best effort broadcasting of data throughout broadcasting overlay 110 so that broadcasting overlay 110 may propagate messages sent to broadcasting overlay 110 throughout the entire broadcasting overlay 110 and eventually reach all nodes 102 in broadcasting overlay 110. Broadcasting overlay 110 may not guarantee that every message received by broadcasting overlay 110 does reach all nodes 102 in broadcasting overlay 110, and may not offer any quality of service (QoS) guarantees, such as in order delivery of messages, delivery of messages within a maximum latency, bounds on jitters, guarantees on available communication and networking bandwidth, and the like.

Nodes 102 may form a dynamic topology for broadcasting overlay 110 because the nodes in nodes 102 and the connections between nodes of nodes 102 may change over time. Each node of nodes 102 may be connected to one or more neighboring nodes of nodes 102. To perform best effort broadcasting of messages, each node of nodes 102 may, upon receiving a message, forward the message to each of its one or more neighboring nodes.

Services 104 may execute at one or more servers, cloud-based server systems, network devices, and the like that are connected to nodes 102 to provide services to broadcasting overlay 110 and computing devices 120. In some examples, services 104 are examples of Privacy-preserving Overlayed Secure Transports and Services (POSTS). Services 104 may be connected to one or more nodes of nodes 102 via network 112 and/or may be hosted on the same servers, systems, and devices of one or more nodes of nodes 102.

In some examples, services 104 may include one or more storage services for secure storage of data and/or for facilitating secure communications between two or more of computing devices 120. In some examples, services 104 may also include one or more mixing services for performing mixing of data being broadcasted in broadcasting overlay 110 and/or to perform onion routing of such data being broadcasted in broadcasting overlay 110.

Services 104 may also include one or more secure gateways, for interfacing with other services outside of overlay network 110. For example, a secure gateway may interface with a search engine to send search queries received from computing devices 120 that are stripped of any metadata that may identify the computing device and the user of the computing device that sent the search query to the secure search gateway. The secure gateway may also receive search results from search engines that are responsive to the search queries sent by the secure gateway, and the secure gateway may forward such search queries via broadcasting overlay 110 to computing devices 120.

Computing devices 120 may securely communicate with each other and with services 104 via broadcasting overlay 110 in part by utilizing end-to-end encryption of messages sent to and received from broadcasting overlay 110. That is, messages sent and received by computing devices 120 and services 104 over broadcasting overlay 110 may be encrypted with one or more encryption keys, and recipients of such encrypted messages may be able to decrypt such encrypted messages using corresponding encryption keys. As such, computing devices 120 and services 104 may be associated with and/or be able to determine encryption keys for encrypting and decrypting messages sent to and received from other computing devices 120 and/or services 104.

In some examples, computing devices 120 and services 104 may use an asymmetric key scheme, such as public key cryptography, to encrypt messages using a public encryption key associated with a recipient, and the recipient of the messages may be able to decrypt the encrypted messages using a corresponding private encryption key. In other examples, computing devices 120 and services 104 may use a symmetric key scheme, where the same encryption key used to encrypt a message can also be used to decrypt the encrypted message.

Computing devices 120 may register with pseudonymous offline directory service (PODS) 106 to receive encryption keys associated with computing devices 120. That is, PODS 106 may generate encryption keys associated with computing device 120. For example, computing device 120A may register with PODS 106 to receive, from PODS 106, an encryption key associated with computing device 120A, computing device 120B may register with PODS 106 to receive, from PODS 106, an encryption key associated with computing device 120B, and the like. In the example where computing devices 120 utilizes a public key cryptography scheme, the encryption keys associated with computing devices 120 may be private encryption keys associated with computing devices 120 that are used to decrypt messages encrypted using corresponding public encryption keys. In the example where computing devices 120 utilizes a symmetric key cryptography scheme, the encryption keys associated with computing devices 120 may be symmetric encryption keys associated with computing devices 120 that are used to encrypt and decrypt messages.

In some examples, the encryption keys associated with computing devices 120 may be identity-based encryption keys associated with users of computing device 120. That is, the encryption key associated with computing device 120A may be an encryption key associated with the user of computing device 120A, the encryption key associated with computing device 120B may be an encryption key associated with the user of computing device 120B, and the like.

In the examples where the encryption keys associated with computing devices 120 may be identity-based private encryption keys, corresponding public encryption keys can be derived based on the identity of the users of computing devices 120. Specifically, the public encryption key for encrypting a message that can be decrypted by an identity-based private encryption key associated with a user of a computing device can be derived based at least in part on a pseudonym of the user. The pseudonym of a user may be an e-mail address of the user, a social media account username of the user, the username of the user on a website, a phone number of the user, and the like. Thus, for example, a user of computing device 120A may determine the public encryption key for encrypting a message to be decrypted by a user of computing device 120A may determining a pseudonym, such as an e-mail address, of the user of computing device 120B, derive a public encryption key associated with the user of computing device 120B based on the pseudonym of the user of computing device 120B, and encrypt a message intended for the user of computing device 120B using the derived public encryption key associated with the user of computing device 120B.

In some examples, PODS 106 may store information that can be used to derive public encryption keys for corresponding private encryption keys associated with computing devices 120. Such information may include, in some examples, pseudonyms associated with users of computing devices 120. If computing devices 120 utilizes symmetric key cryptography to encrypt and decrypt messages, PODS 106 may store associations of pseudonyms of users of computing devices 120 with information that can be used to derive symmetric encryption keys associated with the users of computing devices 120. Such information may include the symmetric encryptions keys associated with the users of computing devices 120, portions of the symmetric encryption keys associated with the users of computing devices 120 that can be used by computing devices 120 and/or services 104 to derive the full symmetric encryption keys associated with the users of computing devices 120, and the like.

Computing devices that host services 104 may periodically broadcast an announcement of roles and keys (ARK) to broadcasting overlay 110 that indicates, for each service of services 104, the role associated with the service and information for deriving an encryption key associated with the service. Thus, the ARK may indicate multiple roles and information associated with multiple encryption keys associated with multiple services. A role associated with a service may indicate the function being performed by the service, and examples of roles of services 104 may include a secure storage role, a secure messaging storage role, a mixing role, a secure gateway role, and the like. By broadcasting the ARK through broadcasting overlay 110, the ARK may reach each of nodes 102 and each of computing devices 120 connected to broadcasting overlay 110, so that each of nodes 102 and each of computing devices 120 is able to determine, based on the ARK, the role associated with each of services 104 and information for deriving an encryption key associated with each of services 104, thereby enabling computing device 120 to determine, for a specified role, such as a role of storing messages for one or more particular users, a service of services 104 associated with the specified role.

In some examples, instead of using a push model to transmit ARKs to computing devices 120, computing devices 120 may send requests for the latest ARK to broadcasting overlay 110 to receive the latest ARK from broadcasting overlay 110. That is, when services 104 broadcasts an ARK, broadcasting overlay 110 may not necessarily transmit the ARK to computing devices. Instead, nodes 102 of broadcasting overlay 110 may cache the ARK and may wait to receive a request from computing devices 120 to transmit the latest ARK. Nodes 102 may, in response to receiving a request to transmit the latest ARK from computing devices 120, transmit the ARK cached by nodes 102 to computing devices 120.

Computing devices 120 may send, via broadcasting overlay 110, a message intended to be received by a specific service of services 104 by sending messages that are encrypted using an encryption key associated with the service. By encrypting the message to be sent to a service, computing devices 120 may implement end-to-end identity-based encryption to send and receive messages to and from services 104 via broadcasting overlay 110 in an anonymous, secure, and blocking-resistant manner. For example, to send a message intended to be received by service 104A, computing device 120A may derive, based on the information for deriving an encryption key associated with service 104A included in the ARK broadcasted by service 104A, an encryption key associated with service 104A, such as a public encryption key associated with service 104A or a symmetric encryption key associated with service 104A.

Computing device 120A may encrypt a message using the encryption key associated with service 104A and may send the encrypted message to broadcasting overlay 110. For example, computing device 120A may transmit the encrypted message to an entry node of nodes 102 connected to computing device 120A. Nodes 102 may perform best effort broadcasting of the encrypted message so that each node of nodes 102 may, upon receiving the encrypted message, forward the message to each of its one or more neighboring nodes in nodes 102. By performing best effort broadcasting of the encrypted message, the encrypted message may eventually reach one or more of services 104.

When a service of services 104 receives an encrypted message, the service may determine whether the service is the intended recipient of the message by attempting to decrypt the message using an encryption key associated with the service, such as a private encryption key associated with the service or a symmetric encryption key associated with the service. When the encrypted message sent by computing device 120A is received by each of services 104, only service 104A may be able to decrypt the encrypted message because the encrypted message is encrypted using the encryption key associated with service 104A, such as a public encryption key associated with service 104A or a symmetric encryption key associated with service 104A. Service 104A may therefore perform one or more actions based on the message. For example, if service 104A is associated with a secure storage role for a user of computing device 120A, service 104A may store the message until service 104A receives a request from computing device 120A to retrieve the message. In another example, if service 104A is associated with a secure search gateway role, service 104A may formulate a search query based on the message and may send the search query to a search engine.

In some examples, services 104 may also send one or more messages to computing devices 120. For example, if services 104 is associated with a secure storage role for a user of computing device 120A, service 104 may, in response to receiving a request from computing device 120A for data stored by service 104, send a message that includes the requested data to computing device 120A via broadcasting overlay 110.

To send a message to computing device 120A, service 104 may determine an encryption key associated with the user of computing device 120A, such as a public encryption key associated with the user of computing device 120A or a symmetric encryption key associated with the user of computing device 120A. In some examples, computing device 120A may include, in a message sent to service 104, an indication of a pseudonym of the user of computing device 120A, and service 104 may be able to derive an encryption key associated with the user of computing device 120A based on the pseudonym of the user of computing device 120A. For example, service 104A may execute an algorithm or function to generate, based on the pseudonym of the user of computing device 120A, an encryption key associated with the user of computing device 120A.

In some examples, service 104A may communicate with PODS 106 to use the pseudonym of the user of computing device 120A to look up an encryption key associated with the user of computing device 120A and to receive, from PODS 106, an encryption key associated with the user of computing device 120A. In some examples, service 104A may communicate with PODS 106 to use the pseudonym of the user of computing device 120A to look up information associated with the encryption key associated with the user of computing device 120A. Service 104A may receive, from PODS 106, the information associated with the encryption key associated with the user of computing device 120A and may determine, based on the information associated with the encryption key associated with the user of computing device 120A, the encryption key associated with the user of computing device 120A.

Service 104A may therefore encrypt a message using the encryption key associated with the user of computing device 120A and may transmit the encrypted message to an entry node of nodes 102 connected to service 104A. Nodes 102 may perform best effort broadcasting of the encrypted message so that each node of nodes 102 may, upon receiving the encrypted message, forward the message to each of its one or more neighboring nodes in nodes 102. By performing best effort broadcasting of the encrypted message, the encrypted message may eventually reach one or more of computing devices 120.

When a computing device of computing devices 120 receives an encrypted message, the computing device may determine whether the computing device is the intended recipient of the message by attempting to decrypt the message using an encryption key associated with the computing device, such as a private encryption key associated with the computing device or a symmetric encryption key associated with the device. When the encrypted message sent by service 104A is received by each of computing devices 120, only computing device 120A may be able to decrypt the encrypted message because the encrypted message is encrypted using the encryption key associated with computing device 120A, such as a public encryption key associated with computing device 120A or a symmetric encryption key associated with computing device 120A.

Computing device 120A may therefore decrypt the encrypted message using the encryption key associated with computing device 120A.

In some examples, two or more computing devices 120, such as computing devices 120A and 120B, may use end-to-end identity-based encryption to send and receive messages between each other in an anonymous, secure, and blocking-resistant manner using broadcasting overlay 110 and a service of services 104 associated with a secure storage role. To send a message to a user of computing device 120B, computing device 120A may send a message via broadcasting overlay 110 to a service associated with a secure storage role of storing messages intended for the user of computing device 120B, and the service may send the message received from computing device 120A via broadcasting overlay 110 to computing device 120B.

To send a message to a user of computing device 120B via a service associated with a secure storage role of storing messages intended for the user of computing device 120B, computing device 120A may determine an encryption key associated with the user of computing device 120B. Computing device 120B may also determine the service out of services 104 associated with a secure storage role of storing messages intended for the user of computing device 120B. Computing device 120B may also determine the encryption key associated with the service associated with a secure storage role of storing messages intended for the user of computing device 120B.

Computing device 120A may determine, based on the ARKs broadcasted by services 104, that service 104A is associated with a secure storage role of storing messages intended for the user of computing device 120B and may also determine, based on the ARKs broadcasted by services 104, the encryption key associated with service 104A. In some examples, to determine an encryption key associated with the user of computing device 120B, computing device 120A may be able to derive an encryption key associated with the user of computing device 120B based on the pseudonym of the user of computing device 120B. For example, computing device 120A may execute an algorithm or function to generate, based on the pseudonym of the user of computing device 120B, an encryption key associated with the user of computing device 120B.

In some examples, computing device 120A may communicate with PODS 106 to use the pseudonym of the user of computing device 120B to look up an encryption key associated with the user of computing device 120B and to receive, from PODS 106, an encryption key associated with the user of computing device 120B. In some examples, computing device 120A may communicate with PODS 106 to use the pseudonym of the user of computing device 120B to look up information associated with the encryption key associated with the user of computing device 120B. Computing device 120A may receive, from PODS 106, the information associated with the encryption key associated with the user of computing device 120B and may determine, based on the information associated with the encryption key associated with the user of computing device 120B, the encryption key associated with the user of computing device 120B.

Computing device 120A may therefore encrypt a message to be sent to computing device 120B using the encryption key associated with the user of computing device 120B to generate a first encrypted message. Computing device 120A may encrypt the first encrypted message using the encryption key associated with service 104A to generate a second encrypted message. Computing device 120A may send the second encrypted message to broadcasting overlay 110. For example, computing device 120A may transmit the second encrypted message to an entry node of nodes 102 connected to computing device 120A. Nodes 102 may perform best effort broadcasting of the second encrypted message so that each node of nodes 102 may, upon receiving the second encrypted message, forward the message to each of its one or more neighboring nodes in nodes 102. By performing best effort broadcasting of the second encrypted message, the encrypted message may eventually reach one or more of services 104.

Service 104A may, in response to receiving the second encrypted message, be able to use an encryption key associated with service 104A to decrypt the second encrypted message to generate the first encrypted message that is encrypted using an encryption key associated with the user of computing device 120A. Service 104A may therefore store or otherwise persist the first encrypted message.

Computing device 120B may periodically send, to service 104A via broadcasting overlay 110, requests for messages intended for the user of computing device 120B. For example, computing device 120B may determine, based on ARKs broadcasted by services 104, that service 104A is associated with a secure storage role of storing messages intended for the user of computing device 120B and may also determine, based on the ARKs broadcasted by services 104, the encryption key associated with service 104A. Computing device 120B may therefore formulate a message that indicates a request for service 104A to send any messages intended for the user of computing device 120B.

Computing device 120B may include an indication of the pseudonym in the message and may encrypt the message using the encryption key associated with service 104A to generate an encrypted message. Computing device 120B may send the encrypted message to broadcasting overlay 110. For example, computing device 120B may transmit the encrypted message to an entry node of nodes 102 connected to computing device 120A. Nodes 102 may perform best effort broadcasting of the encrypted message so that each node of nodes 102 may, upon receiving the encrypted message, forward the message to each of its one or more neighboring nodes in nodes 102. By performing best effort broadcasting of the encrypted message, the encrypted message may eventually reach one or more of services 104.

Service 104A may, in response to receiving the encrypted message sent by computing device 120B, decrypt the encrypted message using an encryption key associated with service 104A. Service 104A may determine, based on the message, the pseudonym of the user of computing device 120B. Service 104A may therefore determine, based on the pseudonym of the user of computing device 120B, an encryption key associated with the user of computing device 120B, and may encrypt messages stored in services 104A that are intended for the user of computing device 120B using the encryption key associated with the user of computing device 120B to generate one or more encrypted messages.

Service 104A may transmit the one or more encrypted messages to an entry node of nodes 102 connected to service 104A. Nodes 102 may perform best effort broadcasting of the one or more encrypted messages that each node of nodes 102 may, upon receiving the one or more encrypted messages, forward the one or more encrypted messages to each of its one or more neighboring nodes in nodes 102. By performing best effort broadcasting of the encrypted message, the encrypted message may eventually reach one or more of computing devices 120.

When computing device 120B receives the one or more encrypted messages, computing device 120B may be able to decrypt the one or more encrypted messages using an encryption key associated with the user of computing device 120B. Computing device 120B may therefore perform one or more actions on the one or more messages, such as by displaying the one or more messages at a display device. In this way, computing devices may use broadcasting overlay 110 and services 104 to securely send and receive messages to and from each other.

Figure 2:
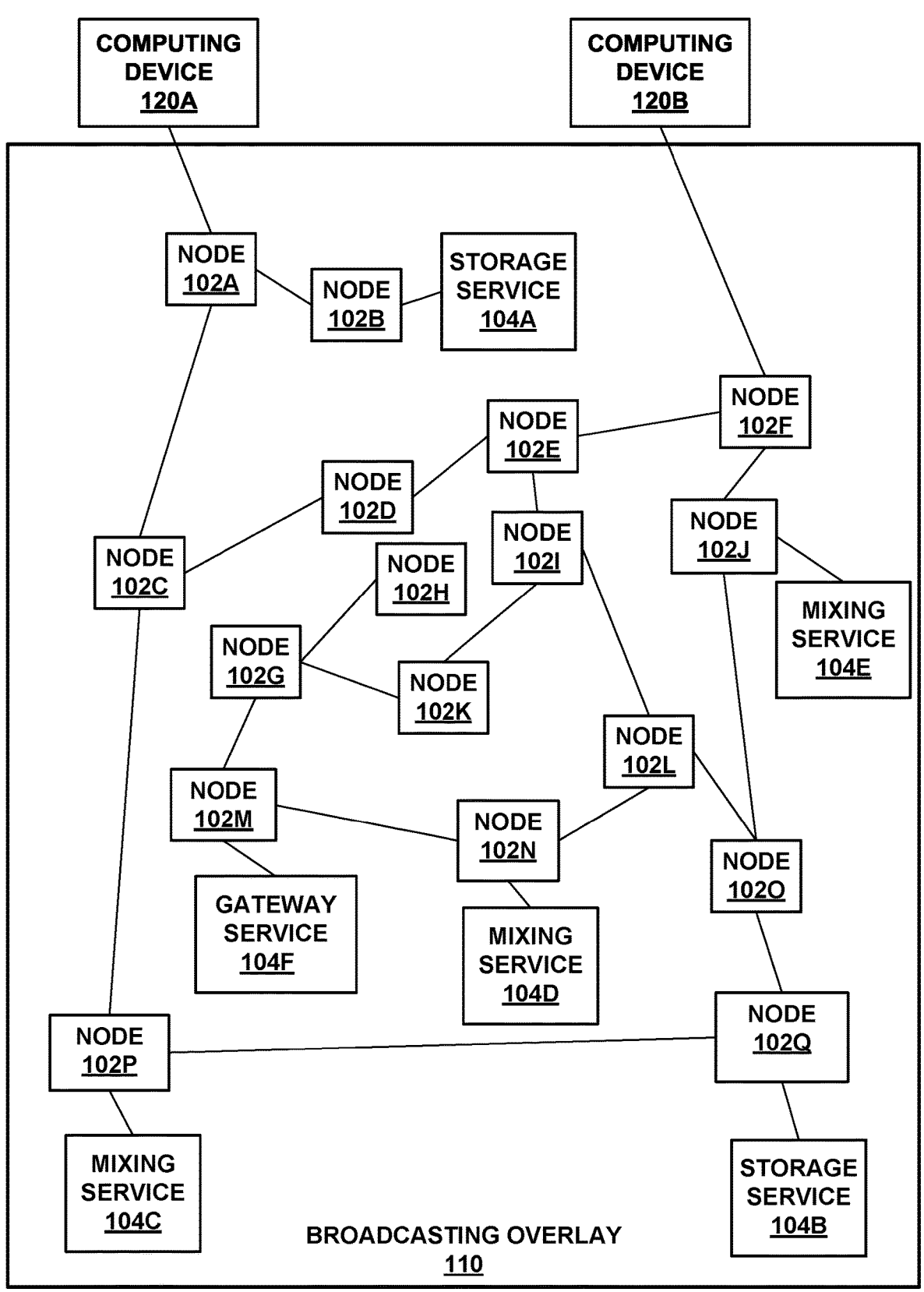
FIG. 2 is a block diagram illustrating the broadcasting overlay and the services of FIG. 1 in further detail.

FIG. 2 is a block diagram illustrating the broadcasting overlay 110 and the services 104 of FIG. 1 in further detail. In particular, FIG. 2 illustrates broadcasting overlay 110 that is a BEBO that performs broadcasting-based relaying and forwarding of traffic, sometimes also referred to as flooding, so that such traffic eventually reaches all nodes of the BEBO. The BEBO performs best effort broadcasting of traffic so that the BEBO may attempt to deliver a message sent to the BEBO to all of the nodes connected in the BEBO, but the BEBO may not offer any guarantees on the delivery of the message, such as delay, jitter, and/or bandwidth in the BEBO to send and receive the message.

The design of the BEBO may enable applications and services, such as secure messaging applications, secure cloud drop box applications, search engines, and the like to operate in a secure and privacy-enabling fashion, and may make it difficult for entities to block and/or spy on the traffic to and from such applications and services. For example, by performing best-effort broadcasting of messages received by the BEBO so that all nodes in the BEBO eventually receive messages received by the BEBO, it may be difficult to block such messages from being received by intended recipients because blocking a subset of the nodes in the BEBO may nevertheless fail to prevent the messages from reaching their intended recipients. Further, because messages sent to and from the BEBO utilize end-to-end encryption and may be encrypted with multiple layers of encryption, it may be difficult for adversaries monitoring traffic in the BEBO to determine the contents of such messages.

Furthermore, because messages sent to and from the BEBO do not include an unencrypted indication of the sender or the intended recipient of the messages, it may be difficult for adversaries monitoring traffic in the BEBO to determine the sender and the intended recipients of messages in the BEBO. Instead, because messages are encrypted using at least the encryption keys of the intended recipients, and because messages may be broadcasted within BEBO to reach every node in the BEBO, it may be difficult if not impossible for adversaries to be able to determine and block the paths that the messages may take to the intended recipients of the messages.

One or more entities may create a BEBO in a network, such as network 112, by deploying an initial set of seed nodes on different servers and/or cloud systems, and may provide each seed node with information regarding a subset of other seed nodes, such as Internet Protocol (IP) addresses, hostnames, Transport Control Protocol (TCP) and/or User Datagram Protocol (UDP) port numbers, of the subset of other seed nodes. Such a subset of other seed nodes may be chosen randomly from the seed nodes or may be chosen to ensure a certain graph structure between the seed nodes, such as to ensure enough redundant paths and connections between every pair of seed nodes.

Each node in the set of seed nodes may send a ping to every other node of a set of x nodes in the set of seed nodes, where x is a configurable number of nodes, and may connect to each of the set of x nodes that replies to the ping as neighbor nodes. When two nodes become neighboring nodes of each other, the two nodes may exchange, with each other, information regarding a subset y of the neighboring nodes of each of the two nodes. For example, a first of the two nodes may send information regarding a subset y of the first node's neighboring nodes to the second of the two nodes, and the second of the two nodes may send information regarding a subset y of the second node's neighboring nodes to the first of the two nodes. Such information may include the IP addresses and/or hostnames of the subset y of the neighboring nodes, the TCP and/or UDP port numbers of the subset y of the neighboring nodes, and the like.

Each node in the set of seed nodes may also periodically (e.g., every five minutes) send a heartbeat message to each of its neighbor nodes to ensure that the link between the nodes are up. If any neighbor node does not reply to the heartbeat message within a specified timeout period (e.g., 1 second), the node may mark the neighbor node as unavailable for a certain time period. In some examples, the node may attempt to retransmit the heartbeat message a specified number of times, and may increase the timeout period for replying to the retransmitted heartbeat messages (e.g., to 3 seconds) each time the heartbeat message is retransmitted. If a neighboring node replies to the retransmitted heartbeat message, the node may mark the neighboring node as available.

Each node in the set of seed nodes may periodically (e.g., every day) drop a subset (e.g., 2 or 3) of current neighboring nodes and may select a set of random nodes that are neighboring nodes of the node's neighboring nodes to connect as neighboring nodes. As described above, each pair of neighboring nodes may exchange information regarding the neighboring nodes of each node of the pair of neighboring nodes, and each node may use such information to connect to the set of random nodes.

Periodically, new nodes may join the BEBO. A node may join a BEBO by obtaining, out-of-band, a set of addresses of a set of nodes in the BEBO. Each new node may send a ping to every other node of a set of x nodes in the set nodes, where x is a configurable number of nodes, and may connect to each of the set of x nodes that replies to the ping as neighbor nodes.

In some examples, a node may drop out of the BEBO at any point without contacting any other node in the BEBO. A node may drop out because of hardware failure, a software error, or a hybrid local or network failure. If a node stops receiving any heartbeats or pings from a neighboring node, the node can determine that the neighboring node has dropped out and may continue to monitor traffic to the node until the node starts to receive data or control messages once again from neighboring nodes.

In some examples, a node may gracefully drop out of the BEBO by sending a dropout message to neighboring nodes. Each of the neighboring nodes may, in response to the node sending the dropout message, select another node that the neighboring nodes are aware of to replace the node as a neighbor to the neighboring nodes.

In some examples, a catastrophic network failure may cause a large number of nodes in a BEBO to drop out of the BEBO or may cause the BEBO to segmented. Eventually, when the nodes that have dropped out regain network connectivity, such nodes may reestablish connections to nodes that were previously neighboring nodes, or may connect with other nodes in the BEBO.

As the number of nodes in a BEBO grows, the BEBO may implement selection techniques such as multi-point relay and optimized link state routing to reduce the amount of data traffic in the BEBO when messages are broadcasted throughout the nodes of the BEBO. For example, a node having two or more neighboring nodes may select one or more of the two or more neighboring nodes as a multi-point relay for the node, and may only forward traffic to the one or more neighboring node selected as the multi-point relay for the node, and may not forward traffic to any remaining neighboring nodes not selected as the multi-point relay for the node.

A node may select one or more neighboring nodes as a multi-point relay for the node via any suitable technique. For example, a node may select one or more neighboring nodes as multi-point relays to cover isolated second-hop neighbors (e.g., neighboring nodes of neighboring nodes of the node). The node may also select an additional one or more neighboring nodes as multi-point relays based on a maximum coverage criteria, to ensure that all second-hop neighbors of the node can receive traffic forwarded by the node to the multi-point relays.

As shown in FIG. 2, broadcasting overlay 110 may be a BEBO that includes nodes 102A-102Q, which are examples of nodes 102 of FIG. 1. Broadcasting overlay 110 also includes storage services 104A and 104B, mixing services 104C-104E, and gateway service 104F, all of which are examples of services 104 of FIG. 1. Storage services 104A and 104B may be services associated with a secure storage role, such as a secure storage role for users of computing devices 120. Mixing services 104C-104E may be services associated with a message mixing role. That is, each of mixing services 104C-104E may receive a sequence of messages and, in response, shuffle the ordering of the sequence of messages and transmit the shuffled ordering of the sequence of messages to nodes 102. Gateway service 104F may be a service associated with a gateway service role to connect to and communicate with external services.

Each of services 104 can connect to a node of nodes 102 in broadcasting overlay 110. For example, service 104A connects to node 102B, service 104B connects to node 102Q, service 104C connects to node 102P, service 104D connects to node 102N, service 104E connects to node 102J, and service 104F connects to node 102M. In some examples, a server or a device that executes a service may communicate with a server or a device that executes a node to connect the service to the node. In some examples, a service connects with a node by being executed on the same server or device. In some examples, a service connects with a node when the node implements the service (e.g., when the service is a functionality performed by the service).

In some examples, broadcasting overlay 110 is a BEBO where each of nodes 102 may perform best effort broadcasting of messages throughout broadcasting overlay 110. To perform best effort broadcasting of messages, each of nodes 102 may, in response to receiving a message, forward the message to each of its neighboring nodes. In the example of FIG. 2, node 102A may receive a message from computing device 120A and may forward the message to neighboring nodes 102B and 102C. Node 102B may receive the message from node 102A and may forward the message to service 104A. Node 102C may receive the message from node 102A and may forward the message to neighboring nodes 102P and 102D. Node 102P may receive the message from node 102A and may forward the message to service 104C connected to node 102C and to neighboring node 102Q. Node 102D may receive the message from node 102C and may forward the message to node 102E, and so on. By performing best effort forwarding of messages, nodes 102 may forward messages to each node of nodes 102 in broadcasting overlay 110 and to each service of services 104 connected to broadcasting overlay 110.

Computing devices 120 may send a message that indicate intended recipient of the message through broadcasting overlay 110 by encrypting the message using an encryption key associated with the intended recipient of the message. For example, if computing device 120A determines to send a message that is intended for storage service 104B, computing device 120A may determine an encryption key associated with storage service 104B, encrypt the message using the encryption key associated with storage service 104B to generate an encrypted message, and transmit the encrypted message to node 102A connected to computing device 120A so that nodes 102 may broadcast the encrypted message throughout nodes 102 of broadcasting overlay 110. For example, the encrypted message may travel from node 102A to node 102C to node 102P to node 102Q to reach storage service 104B. Storage service 104B may therefore be able to receive the encrypted message via nodes 102, decrypt the encrypted message, and store the decrypted message.

Similarly, services 104 may send a message that indicates an intended recipient of the message through broadcasting overlay 110 by encrypting the message using an encryption key associated with the intended recipient of the message. For example, if storage service 104A determines to send a message that is intended for a user of computing device 120B, storage service 104A may determine an encryption key associated with the user of computing device 120B, encrypt the message using the encryption key associated with the user of computing device 120B to generate an encrypted message, and transmit the encrypted message to node 102B connected to service 104A so that nodes 102 may broadcast the encrypted message throughout nodes 102 of broadcasting overlay 110. For example, the encrypted message may travel from node 102B to node 102A to node 102C to node 102D to node 102E to node 102F to reach computing device 120B. Computing device 120B may therefore be able to receive the encrypted message via nodes 102 and decrypt the encrypted message using an encryption key associated with the user of computing device 120B.

In some examples, a message broadcasted by nodes 102 of broadcasting overlay 110 may be encrypted with two or more encryption keys, and the order of encrypting the message with two or more encryption keys may indicate the order in which services 104 and computing devices 120 may perform actions on the message. For example, to send a message to a user of computing device 120B via storage service 104B, computing device 120A may first encrypt the message using an encryption key associated with the user of computing device 120B to generate a first encrypted message, and computing device 120A may subsequently encrypt the first encrypted message using an encryption key associated with storage service 104B to generate a second encrypted message. Computing device 120A may therefore transmit the second encrypted message to node 102A to be broadcasted throughout overlay network 110.

Because computing device 120A applies the encryption key of storage service 104B to a first encrypted message that is already encrypted using the encryption key of the user of computing device 120B to generate the second encrypted message, storage service 104B may have to decrypt the second encrypted message using an encryption key associated with storage service 104B to generate the first encrypted message before computing device 120B is able to decrypt the first encrypted message using an encryption key associated with the user of computing device 120B. Thus, even if computing device 120B receives the second encrypted message prior to storage service 104B receiving the second encrypted message, computing device 120B is unable to decrypt the second encrypted message. Instead, computing device 120B may have to wait for storage service 104B to receive the second encrypted message, decrypt the second encrypted message using an encryption key associated with storage service 104B to generate the first encrypted message, and transmit the first encrypted message to nodes 102. Computing device 120B may therefore receive the first encrypted message and may decrypt the first encrypted message using an encryption key associated with the user of computing device 120B to generate the message and to perform an action to the message, such as by displaying the message.

In some examples, computing devices 120 may be able to select two or more services of services 104 to each perform an actions on a message by encrypting a message using an encryption key associated with each of the two or more services, thereby enabling nodes 102 of broadcasting overlay 110 and services 104 to perform onion routing of the message. For example, computing device 120A may select mixing service 104E, mixing service 104D, and storage service 104B to perform, in that order, onion routing of a message by encrypting a message using an encryption key associated with storage service 104B to generate a first encrypted message, encrypt the first encrypted message using an encryption key associated with mixing service 104D to generate a second encrypted message, and encrypt the second encrypted message using an encryption key associated with mixing service 104E to generate a third encrypted message.

Computing device 120A may transmit the third encrypted message to node 102A for broadcasting throughout nodes 102. Because computing device 120A applied the encryption key associated with mixing service 104E last to generate the third encrypted message, mixing service 104E may be the only service of services 104 or nodes 102 that may be able to decrypt the third encrypted message, even if the third encrypted message is encountered by other nodes 102 and services 104 prior to being received by mixing service 104E. Mixing service 104E may therefore, in response to receiving the third encrypted message, decrypt the third encrypted message using the encryption key associated with mixing service 104E to generate the second encrypted message. Mixing service 104E may therefore perform mixing of an ordering of a sequence of messages received by mixing service 104E together with the second encrypted message and transmit a shuffled ordering of a sequence of messages that include the second encrypted message to node 102J for broadcast throughout nodes 102.

Because computing device 120A applied the encryption key associated with mixing service 104D to encrypt a first encrypted message to generate the second encrypted message, mixing service 104D may be the only service of services 104 or nodes 102 that may be able to decrypt the second encrypted message. Mixing service 104D may therefore, in response to receiving the second encrypted message, decrypt the second encrypted message using the encryption key associated with mixing service 104D to generate the first encrypted message. Mixing service 104D may therefore perform mixing of an ordering of a sequence of messages received by mixing service 104D together with the first encrypted message and transmit a shuffled ordering of a sequence of messages that include the first encrypted message to node 102N for broadcast throughout nodes 102.

Because the first encrypted message is encrypted using an encryption key associated with storage service 104B, storage service 104B may be the only service of services 104 or nodes 102 that may be able to decrypt the first encrypted message. Storage service 104B may therefore, in response to receiving the first encrypted message, decrypt the first encrypted message using the encryption key associated with storage service 104B to generate the decrypted message. Storage service 104B may therefore perform an action on the decrypted message, such as by storing the decrypted message.

As can be seen, not only may computing device 120A select two or more services out of services 104 that can decrypt a message by encrypting a message using encryption keys associated with each of the two or more services, computing device 120A may also control the order in which the selected two or more services decrypts a message by the order in which the message is encrypted by each of the encryption keys for each of the two or more services. Similarly, a service of services 104 may select one or more services that can decrypt a message by encrypting a message that uses encryption keys associated with one or more other services of services 104. For example, storage service 104B may select mixing services 104D and 104E to each decrypt a message transmitted by storage service 104B by encrypting a message using an encryption key associated with mixing service 104D to generate a first encrypted message and by encrypting the first encrypted message using an encryption key associated with mixing service 104E to generate a second encrypted message.

Storage service 104B may transmit the second encrypted message to node 102Q for broadcast throughout nodes 102 of broadcasting overlay 110. Mixing service 104E may, in response to receiving the second encrypted message, be able to decrypt the second encrypted message using an encryption key associated with mixing service 104E to generate the first encrypted message and may transmit the first encrypted message to node 102J for broadcast throughout nodes 102 of broadcasting overlay 110. Subsequent to mixing service 104E decrypting the second encrypted message to generate the first encrypted message, mixing service 104D may, in response to receiving the first encrypted message, be able to decrypt the first encrypted message using an encryption key associated with mixing service 104D to generate a decrypted message.

In some examples, computing devices 120 and/or services 104 may cause a message to be forwarded through a sequence of two or more mixing services of services 104 without encrypting the message with encryption keys associated with every one of the two or more mixing services. For example, computing device 120A may be able to cause a message to be decrypted by mixing service 104E, forwarded from mixing service 104E to mixing service 104D, decrypted by mixing service 104D, forwarded to storage service 104A, and decrypted by storage service 104A, without encrypting the message using encryption keys associated with each of mixing service 104E, mixing service 104D, and storage service 104A.

Instead, computing device 120A may include, in a message, an indication of a number of mixing services to perform mixing of the message, and may encrypt the message with the encryption key associated with a single mixing service 104E to generate an encrypted message that indicates a sequence of two or more mixing services that are to perform an action on the message. For example, computing device 120A may encrypt a message intended to be received by storage service 102B using an encryption key associated with storage device 104B to generate an encrypted message and may create a second message that include the encrypted message and an indication of a number of mixing services, where the number is two or greater. For example, computing device 120A may create a second message that include the encrypted message and an indication of the number two to indicate that a sequence of two mixing services are to perform mixing of the message. Computing device 120A may therefore encrypt the second message using an encryption key associated with a mixing service of mixing services 104C-104E, such as encryption key associated with mixing services 104E, to generate a second encrypted message.

Computing device 120A may send the second encrypted message to node 102A for broadcast throughout broadcasting overlay 110. When the encrypted message reaches mixing service 104E, mixing service 104E may decrypt the second encrypted message using an encryption key associated with mixing service 104E to generate a first decrypted message and determine, based on the indication of the number of mixing services in the first decrypted message, determine to forward the first decrypted message to another mixing service of mixing services 104C-104E. Mixing service 104E may decrement, by one, the number of mixing services indicated by first decrypted message from the number two to the number one, and may encrypt the decrypted message using an encryption key associated with mixing service 104C to generate a third encrypted message. Mixing service 104E may perform message mixing of the third encrypted message with other messages received by mixing service 104E and may send the third encrypted message to node 102J for broadcast throughout broadcasting overlay 110.

When the encrypted message reaches mixing service 104C, mixing service 104C may decrypt the second encrypted message using an encryption key associated with mixing service 104C to generate a third decrypted message that includes the indication of the number of mixing services and the encrypted message encrypted using an encryption key associated with storage device 104B. Mixing service 104C may determine, based on the third decrypted message, that the third decrypted message indicates there are no more mixing services to which the third decrypted message is to be forwarded. Mixing service 104C may perform message mixing of the encrypted message in the third decrypted message with other messages received by mixing service 104C and may forward the encrypted message to node 102P for broadcast throughout broadcasting overlay 110. When the encrypted message reaches storage service 104A, storage service 104A may decrypt the encrypted message using an encryption key associated with storage service 104A to generate a fourth decrypted message and may perform an action on the fourth decrypted message, such as by storing the fourth decrypted message.

Figure 3:
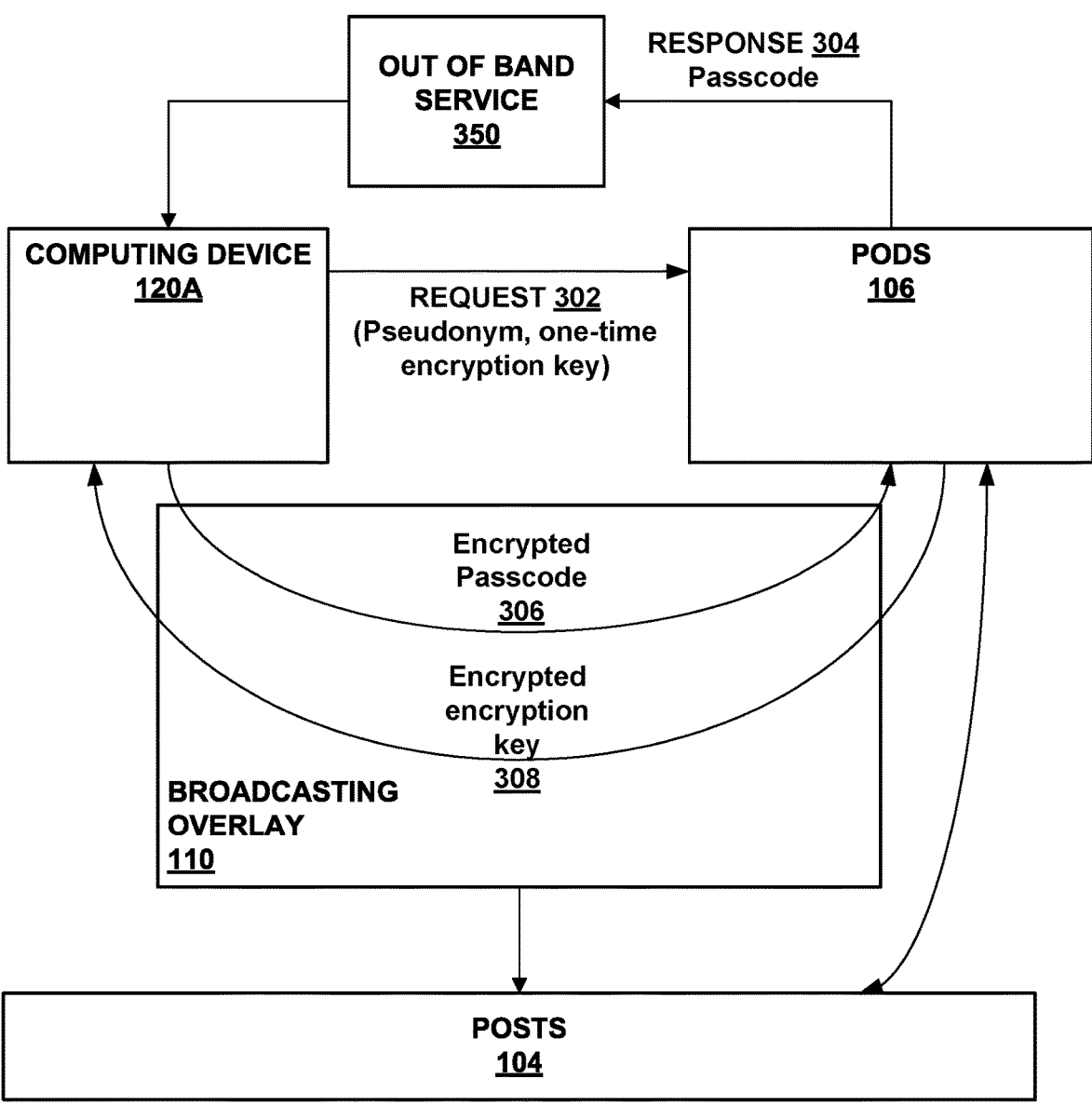
FIG. 3 is a block diagram illustrating an example technique for registering a user with a pseudonym offline directory service, in accordance with aspects of the present disclosure.

FIG. 3 is a block diagram illustrating an example technique for registering a user with a pseudonym offline directory service, in accordance with aspects of the present disclosure. As shown in FIG. 3, a user may use computing device 120A to register with PODS 106 by sending registration request 302 to PODS 106, where registration request 302 includes an indication of a pseudonym of the user of computing device 120A and an indication of a one-time response key used to encrypt communications between computing device 120A and PODS 106 during the registration process. The pseudonym of the user may be an e-mail address of the user, a social media handle of the user, a phone number of the user, or other pseudonym on a communication platform that identifies a platform account with which the user can receive messages. The one-time response key may be an encryption key used to encrypt communications between computing device 120A and PODS 106 during the registration process, and may be a symmetric encryption key used to both encrypt and decrypt communications between computing device 120A and PODS 106.

PODS 106 may receive registration request 302 from computing device 120A and may, in response, send a response 304 that includes a passcode to computing device 120A via out of band service 350. The passcode may be any suitable string of letters and digits and may be randomly generated by PODS 106. The out of band system 350 may be out of band from the communication channel used by computing device 120A to send the registration request 302 to PODS 106. Examples of out of band service 350 may be an e-mail service used by the user, a social media platform used by the user, a text messaging service used by the user, or other communication platform, and the response 304 may be in the form of a communication to the platform account identifiable with the pseudonym of the user sent in Request 302. The communication may be, e.g., an e-mail message sent to the user's e-mail account, a private message sent to the user's account on the social media platform, a text message sent to the user's phone number, and the like.

Computing device 120A may, in response to receiving response 304 from computing device 120A, encrypt the passcode included in response 304 using the one-time key to generate an encrypted passcode 306 and send the encrypted passcode 306 to PODS 106. In some examples, computing device 120A may send the encrypted passcode 306 through broadcasting overlay 110. PODS 106 may use the one-tine key previously received from computing device 120A to decrypt the encrypted passcode 306 to determine whether the decrypted passcode matches the passcode sent by PODS 106 as part of response 304 to computing device 120A.

If PODS 106 determines that the decrypted passcode matches the passcode sent by PODS 106 as part of response 304 to computing device 120A, PODS 106 may generate an encryption key for computing device 120A that can be used by computing device 120A to decrypt encrypted messages intended to be received by computing device 120A. In some examples, the encryption key for computing device 120A may be a symmetric encryption key, so that the same encryption key can be used to encode and decode messages.

In some examples, the encryption key for computing device 120A may be a private encryption key that can decrypt messages encrypted using a corresponding public encryption key. In some examples, the encryption key for computing device 120A can be an identity-based private encryption key. That is, the identity-based private encryption key may have a corresponding public encryption key based on the pseudonym of the user of computing device 120A. Thus, for example, the corresponding public encryption key for the identity-based private encryption key for computing device 120A may be determined based on the pseudonym of the user of computing device 120A, such as based on the e-mail address of the user, the phone number of the user, and the like.

PODS 106 may encrypt the determined encryption key for computing device 120A using the one-time response key to generate an encrypted encryption key 308 and may send the encrypted encryption key 308 to computing device 120A. For example, PODS 106 may send the encrypted encryption key 308 via broadcasting overlay 110 to computing device 120A. Computing device 120A may receive the encrypted encryption key 308 and may decrypt the encrypted encryption key 308 using the one-time response key to generate the encryption key for computing device 120A.

In some examples, PODS 106 may also store a copy of the one-time response key for computing device 120A. In some examples, PODS 106 may store information that can be used to derive 1) the encryption key for computing device 120A if the encryption key for computing device 120A is a symmetric encryption key, or 2) a corresponding public encryption key for the encryption key for computing device 120A if the encryption key for computing device 120A is a private encryption key. In some examples, PODS 106 may store, for a user of computing device 120A, a half key or another suitable portion of a key that can be used to derive a public encryption key for the user of computing device 120A and/or a private encryption key for the user of computing device 120A.

In some examples, PODS 106 may include associations between pseudonyms of users of computing devices 120 registered with PODS 106 and encryption keys associated with the users of computing devices 120. As such, an external computing device may be able to communicate with PODS 106 to index into PODs 106 using a pseudonym (e.g., e-mail address) of a user of a computing device to receive information that can be used to determine an encryption key (e.g., a public encryption key) associated with the user of the computing device.

In some examples, PODS 106 may periodically and asynchronously communicate with services 104 to send to services 104 information associated with encryption keys stored in PODS 106. For example, PODS 106 may send to service 104 information that can be used by services 104 to generate encryption keys, such as public encryption keys, for encrypting messages sent to computing devices 120 registered with PODS 106.

Figure 4:
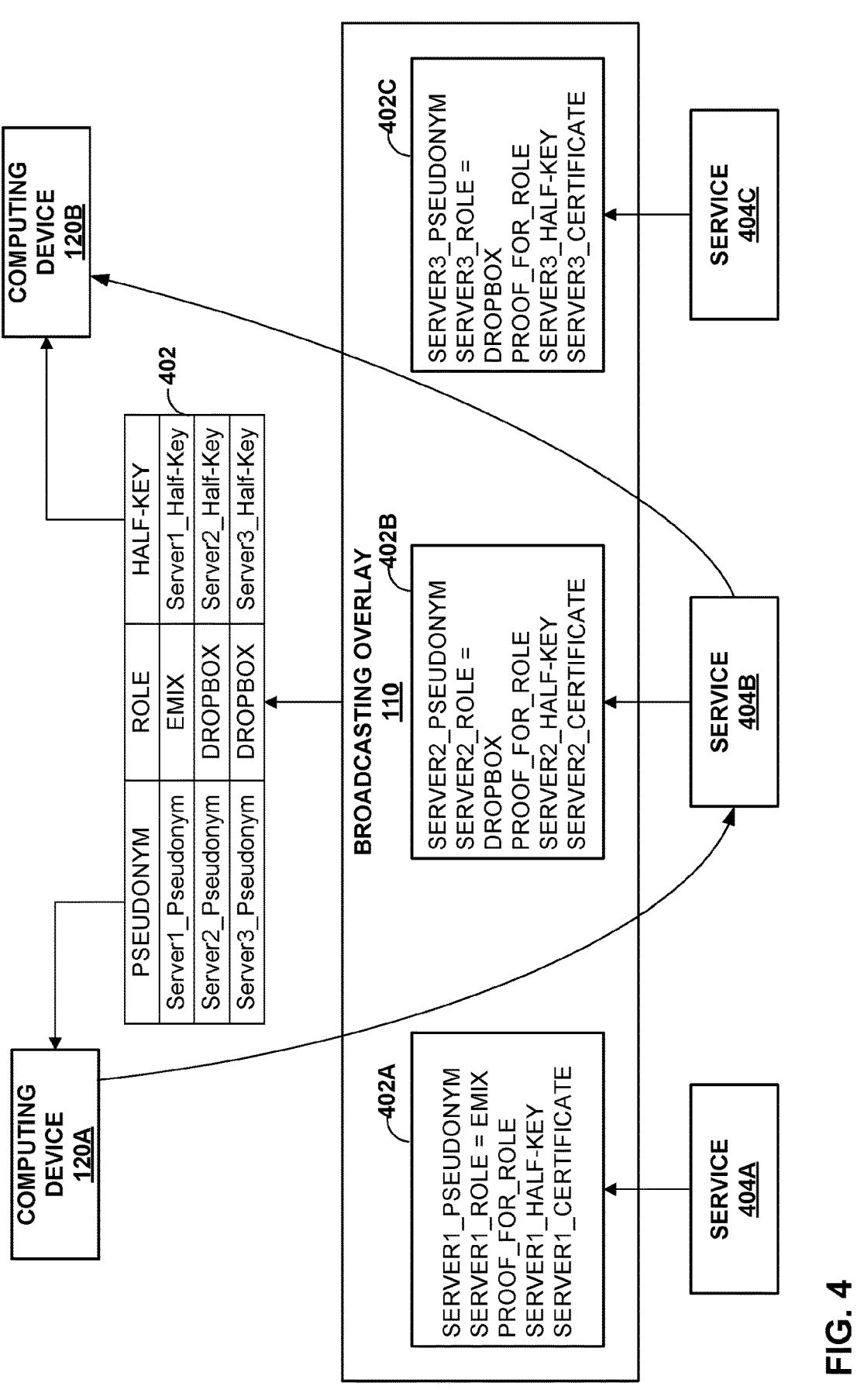
FIG. 4 is a block diagram illustrating an example technique for computing devices to communicate with services using information from the announcements of roles and keys from the services, in accordance with aspects of the present disclosure.

FIG. 4 is a block diagram illustrating an example technique for computing devices to communicate with services using information from the announcements of roles and keys from the services, in accordance with aspects of the present disclosure. As shown in FIG. 4, services 404A-404C ("services 404") are examples of services of services 104. Services 404 may periodically transmit announcements 402A-402C ("announcements 402") of roles and keys to broadcasting overlay 110 that are broadcasted over broadcasting overlay 110 and received by devices 120. For example, service 404A may transmit announcement 402A of roles and keys to broadcasting overlay 110, service 404B may transmit announcement 402B of roles and keys to broadcasting overlay 110, and service 404C may transmit announcement 402C of roles and keys to broadcasting overlay 110. Nodes and services in broadcasting overlay 110 may receive such announcements 402 and may cache announcements 402 at the nodes and services in broadcasting overlay 110 and may also forward the announcements 402 to neighboring nodes so that announcements 402 is broadcasts throughout broadcasting overlay 110 and to computing devices 120.

Each of services 404 may periodically perform cryptographic sortition to determine its role and to generate proof (e.g., proof of eligibility) that the service properly assigned the role to itself. For example, each of services 404 may periodically perform cryptographic sortition to determine whether it should be on or off. If a service determines, based on performing the cryptographic sortition, that it should be off, the service may wait a random period of time less than a specified maximum limit before performing another cryptographic sortition to determine whether it should be on or off.

If a service determines, based on performing the cryptographic sortition, that it should be on, the service may perform a subsequent cryptographic sortition to determine its role. In some examples, the service may determine, based on performing the subsequent cryptographic sortition, its role as one of: a message mixing service or a secure storage service. When a service has a role as a message mixing service, the service may periodically scan broadcasting overlay 110 and retrieve messages being broadcasted throughout broadcasting overlay 110. The service may perform mixing of the retried messages, such as by shuffling the messages so that the resulting order of the shuffled messages is different from the order of the messages as retrieved by the service. The service may also delay the transmission of the shuffled messages to broadcasting overlay 110 by waiting for a random amount of time before transmitting the shuffled messages to broadcasting overlay 110.

When a service has a secure storage role, the service may periodically scan broadcasting overlay 110 to retrieve messages from broadcasting overlay 110 intended for the secure storage of the service. For example, the service may scan broadcasting overlay 110 for messages intended for the pseudonym of the service and may store such messages intended for the pseudonym of the service in the secure storage of the service. When the service has a secure storage role, the service may also periodically transmit messages stored in the secure storage of the service to broadcasting overlay 110. For example, if the secure storage service is a secure storage for messages intended for a user of a computing device, the secure storage service may periodically receive message pull requests from the user. The secure storage service may, in response to receiving such a message pull request from the user, transmit messages in the secure storage intended for the user to broadcasting overlay 110 for broadcast to the user.

Each of announcements 402 of roles and keys made by a service may include an indication of the pseudonym of the service, an indication of the role of the service, an indication of a proof of the role of the service, information for deriving an encryption key associated with the service, and an indication of a certificate of the service.

For example, announcement 402A made by service 404A may include an indication of the pseudonym of service 404A, an indication of the role of service 404A as a mixing service, an indication of the proof of the role of service 404A as a mixing service, information for deriving an encryption key associated with service 404A, and an indication of a certificate of service 404A. Announcement 402B made by service 404B may include an indication of the pseudonym of service 404B, an indication of the role of service 404B as a secure storage service for messages intended for the user of computing device 120B, an indication of the proof of the role of service 404B as a secure storage service, information for deriving an encryption key associated with service 404B, and an indication of a certificate of service 404B. Announcement 402C made by service 404C may include an indication of the pseudonym of service 404C, an indication of the role of service 404C as a secure storage service for messages intended for the user of computing device 120B, an indication of the proof of the role of service 404C as a secure storage service, information for deriving an encryption key associated with service 404C, and an indication of a certificate of service 404C.

In the example of FIG. 4, computing devices 120A and 120B may each receive announcements 402 from services 104 via broadcasting overlay 110 and may determine, based on the indication of the role of service 404B in announcements 402, that service 404B acts as a secure storage service for messages intended for the user of computing device 120B. Computing devices 120A and 120B may also determine, based on the indication of the role of service 404C in announcements 402, that service 404C acts as a secure storage service for messages intended for the user of computing device 120A. Computing devices 120A and 120B may also determine, based on the indication of the role of service 404A in announcements 402, that service 404A acts as a message mixing service.

Therefore, computing device 120A may determine that to send a message to a user of computing device 120B through broadcasting overlay 110, computing device 120A may send a message through broadcasting overlay 110 to service 404B, and service 404B may be able to forward the message to computing device 120B. Computing device 120A may encrypt a message intended for computing device 120B using an encryption key associated with the user of computing device 120B to generate a first encrypted message.

To send the first encrypted message to service 404B, computing device 120A may determine, based on the information for deriving an encryption key associated with service 404B in announcements 402, an encryption key associated with service 404B, such as a public encryption key that corresponds to a private encryption key of service 404B, and may encrypt the first encrypted message using the encryption key associated with service 404B to generate a second encrypted message. Computing device 120A may therefore send the second encrypted message to overlay network 110 for forwarding to service 404B. Service 404B may, in response to receiving the second encrypted message, store the second encrypted message in secure storage.

Computing device 120B may periodically send message pull requests to broadcasting overlay 110 to receive messages intended to be received by the user of computing device 120B. Computing device 120B may determine, based on the announcements 402, that service 404B acts as a secure storage service for messages intended for the user of computing device 120B and may determine, based on the information for deriving an encryption key associated with service 404B in announcements 402, an encryption key associated with service 404B. Computing device 120B may therefore encrypt a pull request message with the encryption key associated with service 404B to generate an encrypted pull request message and may send the encrypted message overlay network 110 for forwarding to service 404B. Service 404B may, in response to receiving the encrypted pull request message, transmit messages stored by service 404B to broadcasting overlay 110 for forwarding to computing device 120B. For example, service 404B may decrypt the second encrypted message in secure storage to generate an encrypted message that is encrypted using an encryption key associated with the user of computing device 120B and may transmit the encrypted message to broadcasting overlay 110 for forwarding to computing device 120B. When computing device 120B receives the encrypted message, computing device 120B is able to decrypt the encrypted message and to perform an action on the message, such as displaying the message.

In some instances, entities such as governments may perform blocking, filtering, and/or other censorship techniques to block or filter portions of a network, such as the Internet. For users who may be subject to such techniques to block or filter a network, the users may use a proxy service to circumvent such attempts at censorship.

Figure 5:
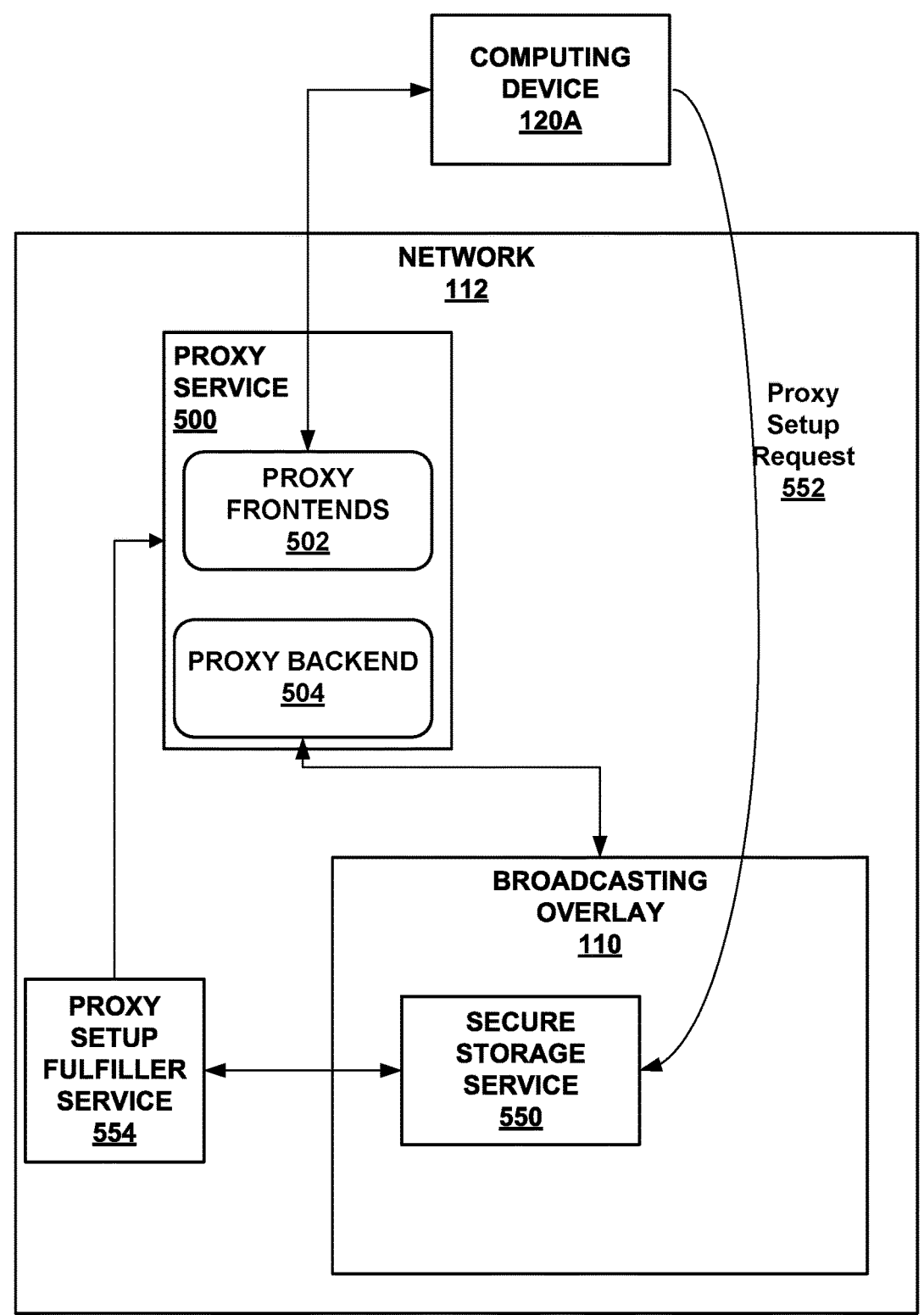
FIG. 5 is a block diagram illustrating an environment in which a user may set up and use a proxy service to circumvent censorship, in accordance with aspects of the present disclosure.

FIG. 5 is a block diagram illustrating an environment in which a user may set up and use a proxy service to circumvent censorship, in accordance with aspects of the present disclosure. As shown in FIG. 5, computing device 120A may execute or otherwise a proxy setup application that enables computing device 120A to setup and use proxy service 500. Such a proxy setup application may include information, such as an identifier of a proxy setup fulfiller service 554 that enables computing device 120A to contact such a proxy setup fulfiller service 554 to setup proxy service 500 for computing device 120A. Computing device 120A may, based on such information included in the proxy setup application, send a proxy setup request 552 via broadcasting overlay 110 of network 112 to secure storage service 550 that stores messages intended for proxy fulfiller service 554. The proxy setup request 552 may include contact information for communicating with computing device 120A, such as information regarding computing device 120A's Internet Protocol (IP) address and port number or information regarding a secure storage service in broadcasting overlay 110 that stores messages intended for computing device 120A.

Proxy fulfiller service 554 may receive proxy setup request 552 via secure storage service 550 and may, in response to receiving the proxy setup request 552, instantiate, create, or otherwise setup proxy service 500 to be used by computing device 120A. Proxy fulfiller service 554 may also send, to computing device 120A, information associated with proxy service 550 to enable computing device 120A to connect to and use proxy service 550 to proxy traffic to and from computing device 120A. For example, proxy fulfiller service 554 may send information associated with proxy service 550 to the IP address and port indicated in the proxy setup request or may send information associated with proxy service 550 to the secure storage service in broadcasting overlay 110 indicated in the proxy setup request.

Proxy service 550 may be a service that executes on one or more containers and/or servers in network 112 to act as a proxy for traffic sent to and received from computing device 120A. In some examples, proxy service 550 may execute on one or more cloud-based systems, such as the cloud-based system of a cloud services provider of which the user of computing device 120A is a registered user. When proxy service 550 executes on one or more cloud-based systems, proxy service 550 may be a cloud-based anonymity and privacy-assisting personal proxy environment (CAPE).

Proxy fulfiller service 554 may setup proxy service 550 to include a series of proxy frontends 502 and proxy backend 504 to interface with the rest of network 112, and computing device 120A may use the information associated with proxy service 550 received from proxy fulfiller service 550 to set up tunnels to proxy frontends 502, such as by using Transport Layer Security (TLS) and/or Secure Sockets Layer (SSL). Computing device 120A may send data traffic via such tunnels to proxy frontends 502, and proxy frontends 502 may forward the data traffic to proxy backend 504 to transmit to the rest of network 112. In some examples, proxy backend 504 may also transmit data traffic via broadcasting overlay 110 to the rest of network 112. Proxy service 550 may periodically (e.g., once a day) change IP address and ports of proxy frontends 502 and proxy backend 504 over a wide range of IP addresses to make it more difficult for proxy service 550 to be blocked without also blocking a wide range of IP addresses.

In some examples, computing device 120A may also enable contacts (e.g., other users) of the user of computing device 120A to also use proxy service 500. For example, computing device 120A may determine one or more contacts of the user of computing device 120A that are also authorized to use proxy service 500 and may send information associated with proxy service 550 to the one or more contacts that enable the one or more contacts to tunnel to proxy frontends 502 of proxy service 500 in order to use proxy service 500. For example, computing device 120A may send information associated with proxy service 550 to the IP addresses and ports of the computing devices of the one or more contacts, to secure storage services in broadcasting overlay 110 associated with the one or more contacts, and the like, to enable the one or more contacts to receive the information associated with proxy service 550.

Proxy frontends 502 may act as a listener for data traffic from authorized users of proxy service 550, such as data traffic from computing device 120A or data traffic from computing devices of one or more contacts authorized to use proxy service 550, and may send such data to proxy backend for forwarding to the rest of network 112. Proxy backend 504 may receive data traffic from proxy frontends 502 and may forward the data traffic to the rest of network 112.

Proxy backend 504 may also listen to traffic in network 112 and/or broadcasting overlay 110 for data traffic intended for the user of computing device 120A or another authorized user of proxy service 550. For example, if proxy backend 504 encounters an encrypted message from, for example, broadcasting overlay 110, proxy backend 504 may determine whether the encrypted message is intended for the user of computing device 120A by attempting to decrypt the encrypted message using an encryption key associated with the user of computing device 120A. If proxy backend 504 is able to decrypt the encrypted message using an encryption key associated with the user of computing device 120A, proxy backend 504 may determine that the message is intended for the user of computing device 120A and may forward the message via proxy frontends 502 to computing device 120A.

In some examples, proxy frontends 502 and proxy backend 504 may execute on the same server or in the same container, or may execute on different servers or in different containers. When proxy frontends 502 and proxy backend 504 execute on different servers or in different containers, such separation of proxy frontends 502 and proxy backend 504 may enable proxy backend 504 to maintain standard Transport Control Protocol (TCP), TLS, and/or SSL connections to resources in network 112, such as website, while computing device 120A may periodically (e.g., per minute or per hour) change the proxy frontend of proxy frontends 502 to which it is connected to evade blocking and/or filtering being applied to network 112.

To enable computing device 120A to periodically switch between different proxy frontends 502, each one of proxy frontends 502 may establish a separate continuous connection, such as TCP/IP connection, with proxy backend 504, and proxy service 550 may perform techniques such as network address translation or mobile IP to enable computer device 120A to send data to proxy frontends 502 that is forwarded to proxy backend 504 and to receive data from proxy backend 504 via proxy frontends 502. For example, proxy service 550 may tunnel IP data to be sent to proxy backend 504 in IP data sent to proxy frontends 502.

Figure 6:
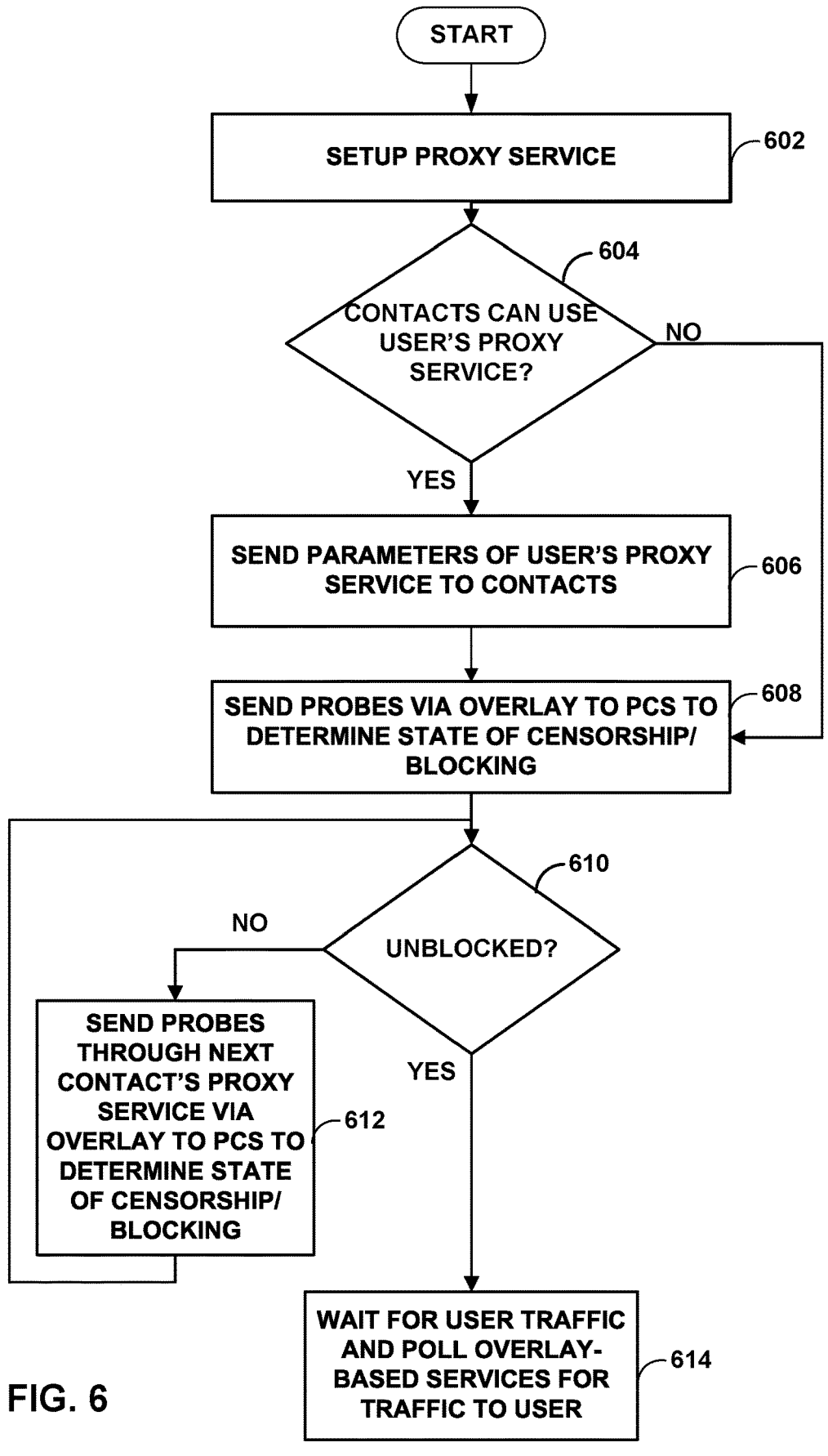
FIG. 6 is a flowchart illustrating techniques for a computing device to use an example proxy service, in accordance with aspects of the present disclosure.

FIG. 6 is a flowchart illustrating techniques for a computing device to use an example proxy service. FIG. 6 is described below with respect to FIG. 5. As shown in FIG. 6, a computing device, such as computing device 120A, may perform setup of a proxy service, such as proxy service 550 (602). To perform the setup of proxy service 550, computing device 120A may send a proxy setup request 552 to proxy setup fulfiller service 554 via broadcasting overlay 110. Proxy setup fulfiller service 554 may receive the proxy setup request 552 and may set up proxy service 550 and send information to computing device 120A to connect to proxy service 550.

Computing device 120A may determine whether other contacts of the user of computing device 120A may also use proxy service 550 (604). If computing device 120A determines that one or more other contacts of the user of computing device 120A are allowed to use proxy service 550, computing device 120A may send information for connection to proxy service 550 to the computing devices of the one or more contacts of the user of computing device 120A (606). For example, computing device 120A may encrypt such information and send such encrypted information to the one or more contacts via e-mail, via text messaging, by sending such encrypted information to secure storage services of broadcasting overlay 110 associated with the one or more contacts, and the like. In some examples, computing device 120A may send such information as invites that include links, such as Universal Resource Locators (URLs), that the one or more contacts may select to automate connecting of the proxy service 550 with computing devices used by the one or more contacts.

Proxy service 550 may determine one or more entry points (e.g., entry nodes) into broadcasting overlay 110 to connect to broadcasting overlay 110. For example, proxy service 550 may receive details of entry points into broadcasting overlay 110 from one or more contacts of computing device 120A, such as during the process of computing device 120A communicating with the one or more contacts to invite the contacts to use proxy service 550.

In any event, once setup of proxy service 550 is complete, computing device 120A may send probes to a ping and calibration service (PCS) to determine the state of censorship and/or blocking in network 112 (608). Specifically, computing device 120A may use the PCS to determine the state of any blocking, filtering, and/or censorship in network 112 that may prevent proxy service 550 from connecting to broadcasting overlay 110 or may cause connections between proxy service 550 and broadcasting overlay 110 to be slow and/or unreliable.

Computing device 120A may therefore determine, based on communicating with the PCS, whether proxy service 550 is blocked from connecting to broadcasting overlay 110 (610). Computing device 120A may determine that proxy service 550 is blocked from connecting to broadcasting overlay 110 if proxy backend 504 of proxy service 550 is unable to connect to entry points of broadcasting overlay 110 or if the connection quality of a connection between proxy backend 504 and broadcasting overlay 110 is below an acceptable level, such as if the ping times is above a threshold, if the rate of dropped packets is above a threshold, and the like.

If computing device 120A determines that proxy service 550 is not blocked from connecting to broadcasting overlay 110, computing device 120A may therefore use proxy service 550 as a proxy for data traffic to and from broadcasting overlay 110 and/or the rest of network 112. In particular, computing device 120A may use proxy service 550 to connect to broadcasting overlay 110 to receive data and/or to poll services in broadcasting overlay 110 for data intended for computing device 120A (614).

If computing device 120A determines that proxy service 550 is blocked from connecting to broadcasting overlay 110, computing device 120A may attempt to use a different proxy service being used by a contact of the user of computing device 120A as the proxy service for communicating with broadcasting overlay 110 and/or the rest of network 112.

When computing device 120A determines that a contact of the user is using another proxy service, computing device 120A may similarly send probes to the PCS (612) to determine whether that proxy service is blocked in network 112 from connecting to broadcasting overlay 110 (610).

Computing device 120A may iterate through proxy services used by contacts of the user of computing device 120A to determine whether the proxy services are blocked in network 112 from connecting to broadcasting overlay 110 until computing device 120A determines that a proxy service being used by a contact is not blocked in network 112 from connecting to broadcasting overlay 110 or until the end of a timeout period is reached. If computing device 120A determines that a proxy service being used by a contact is not blocked in network 112 from connecting to broadcasting overlay 110, computing device 120A may connect to the proxy service, such as by tunneling to one or more proxy frontends of the proxy service to use the proxy service to send and receive data to broadcasting overlay 110 and/or the rest of network 112.

Figure 7:
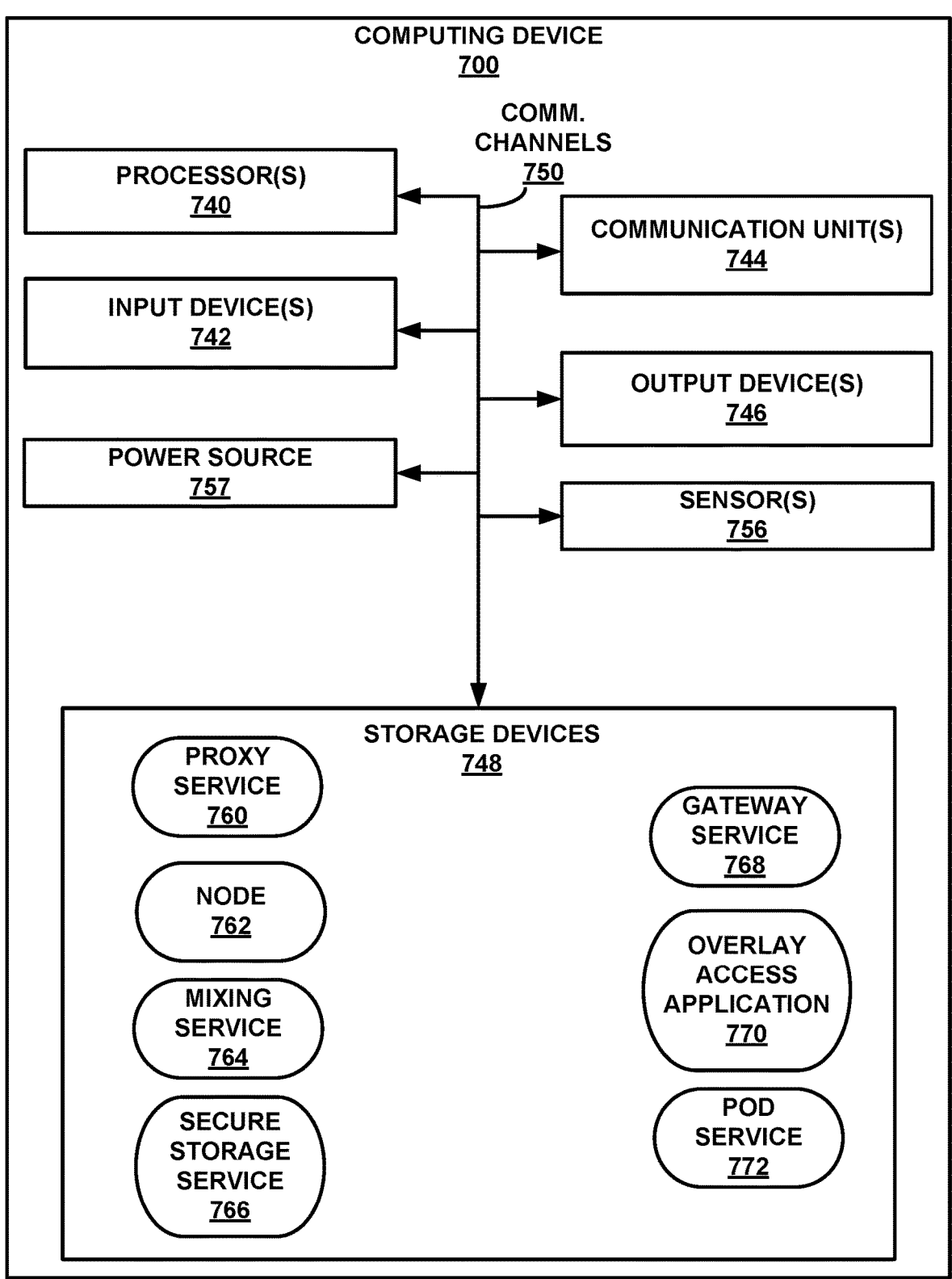
FIG. 7 is a block diagram illustrating an example computing device, in accordance with one or more aspects of the present disclosure.

FIG. 7 is a block diagram illustrating an example computing device, in accordance with one or more aspects of the present disclosure. FIG. 7 illustrates only one particular example of computing device 700, and many other examples of computing device 700 may be used in other instances and may include a subset of the components included in example computing device 700 or may include additional components not shown in FIG. 7.

As shown in the example of FIG. 7, computing device 700 may be an example of one of computing devices 120, an example of a server device that implements one or more of nodes 102, an example of a server device that implements one or more of services 104, a server device that implements POD service 106, and/or a server device that implements proxy service 550.

Computing device 700 includes one or more processors 740, one or more input devices 742, one or more communication units 744, one or more output devices 746, one or more storage devices 748, and one or more sensors 756. One or more input devices 742 and one or more output device 746 may be examples of UIC 4 of FIG. 1. Communication channels 750 may interconnect each of the components 740, 742, 744, 746, 748, and 756 for inter-component communications (physically, communicatively, and/or operatively). In some examples, communication channels 750 may include a system bus, a network connection, one or more inter-process communication data structures, or any other components for communicating data between hardware and/or software.

One or more processors 740 may implement functionality and/or execute instructions within computing device 700. For example, processors 740 on computing device 700 may receive and execute instructions stored by storage devices 748 that provide the functionality of one or more of: proxy service 760, node 762, mixing service 764, secure storage service 766, gateway service 768, overlay access application 770, and/or POD service 772. These instructions executed by processors 740 may cause computing device 700 to store and/or modify information, within storage devices 748 during program execution. Processors 740 may execute instructions of proxy service 760, node 762, mixing service 764, secure storage service 766, gateway service 768, overlay access application 770, and/or POD service 772 to perform one or more operations. That is, proxy service 760, node 762, mixing service 764, secure storage service 766, gateway service 768, overlay access application 770, and/or POD service 772 may be operable by processors 740 to perform various functions described herein.

One or more input devices 742 of computing device 700 may receive input. Examples of input are tactile, audio, kinetic, and optical input, to name only a few examples. Input devices 742 of computing device 700, in one example, include a mouse, keyboard, voice responsive system, video camera, buttons, control pad, microphone or any other type of device for detecting input from a human or machine. In some examples, input device 742 may be a presence-sensitive input device, which may include a presence-sensitive screen, touch-sensitive screen, etc.

One or more output devices 746 of computing device 700 may generate output. Examples of output are tactile, audio, and video output. Output devices 746 of computing device 700, in one example, include a presence-sensitive screen, sound card, video graphics adapter card, speaker, cathode ray tube (CRT) monitor, liquid crystal display (LCD), or any other type of device for generating output to a human or machine. Output devices 746 may include display devices such as cathode ray tube (CRT) monitor, liquid crystal display (LCD), Light-Emitting Diode (LED) or any other type of device for generating tactile, audio, and/or visual output.

One or more communication units 744 of computing device 700 may communicate with external devices by transmitting and/or receiving data. For example, computing device 700 may use communication units 744 to transmit and/or receive radio signals on a radio network such as a cellular radio network. In some examples, communication units 744 may transmit and/or receive satellite signals on a satellite network such as a Global Positioning System (GPS) network. Examples of communication units 744 include a network interface card (e.g. such as an Ethernet card), an optical transceiver, a radio frequency transceiver, a GPS receiver, or any other type of device that can send and/or receive information. Other examples of communication units 744 may include Bluetooth®, GPS, 3G, 4G, and Wi-Fi® radios found in mobile devices as well as Universal Serial Bus (USB) controllers and the like.

One or more storage devices 748 within computing device 700 may store information for processing during operation of computing device 700. In some examples, storage device 748 is a temporary memory, meaning that a primary purpose of storage device 748 is not long-term storage. Storage devices 748 on computing device 700 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 748, in some examples, also include one or more computer-readable storage media. Storage devices 748 may be configured to store larger amounts of information than volatile memory. Storage devices 748 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 748 may store program instructions and/or data associated with one or more of: proxy service 760, node 762, mixing service 764, secure storage service 766, gateway service 768, overlay access application 770, and/or POD service 772.

As shown in FIG. 7, computing device 700 may include one or more sensors 756. Sensors 756 may include an accelerometer that generates accelerometer data. Accelerometer data may indicate an acceleration and/or a change in acceleration of computing device 700. Sensors 756 may include a gyrometer that generates gyrometer data. Gyrometer data may indicate a physical orientation and/or change in physical orientation of computing device 700. In some examples, the orientation may be relative to one or more reference points. Sensors 756 may include a magnetometer that generates magnetometer data. Magnetometer data may indicate the magnetization of an object that is touching or in proximity to computing device 700. Magnetometer data may indicate the Earth's magnetic field, and in some examples, provide directional functionality of a compass. Sensors 756 may include an ambient light sensor that generates ambient light data. The ambient light data may indicate an intensity of light to which computing device 700 is exposed. Sensors 756 may include a proximity sensor that generates proximity data. Proximity data may indicate whether an object is within proximity to computing device 700. In some examples, proximity data may indicate how close an object is to computing device 700. In some examples, sensors 756 may include a clock that generates a date and time. The date and time may be a current date and time.

As shown in FIG. 7, computing device 700 may include a power source 757 In some examples, power source 757 may be a battery. Power source 757 may provide power to one or more components of computing device 700.

In accordance with techniques of the disclosure, computing device 700 may include one or more processors 740 that are configured to execute one or more of: proxy service 760, node 762, mixing service 764, secure storage service 766, gateway service 768, overlay access application 770, and/or POD service 772. In some examples, one or more processors 740 may execute proxy service 760 to perform the functionalities of proxy service 550. In some examples, one or more processors 740 may execute node 762 to perform the functionalities of any one or more of nodes 102. In some examples, one or more processors 740 may execute mixing service 764 to perform the functionalities of a mixing service, such as any one of mixing services 104C-104E of FIG. 2. In some examples, one or more processors 740 may execute secure storage service 766 to perform the functionalities of a secure storage service, such as any one of secure storage services 104A and 104B of FIG. 2. In some examples, one or more processors 740 may execute gateway service 768 to perform the functionalities of a gateway service, such as gateway service 104F of FIG. 2. In some examples, one or more processors 740 may execute POD service 772 to perform the functionalities of POD service 106.

In some examples, one or more processors 740 may execute overlay access application 770, which may be an application used by a user to connect computing device 700 to a proxy service, such as proxy service 550 and/or a broadcasting overlay, such as broadcasting overlay 110, to send and receive messages via the broadcasting overlay 110. In some examples, overlay access application 770 may be a secure messaging application, a secure storage application, a secure search application, and the like, that uses broadcasting overlay 110 to perform such secure messaging, secure searching, and/or secure storage functionalities.

In some examples, overlay access application 770 may, on initial launch, communicate with POD service 106 to enroll the user of computing device 700 in the broadcasting overlay 110 and to determine an identity-based encryption key for computing device 700. Overlay access application 770 may also be configured to send a proxy setup request to a proxy setup fulfiller service, such as proxy setup fulfiller service 554, to set up a proxy service 550 and to create tunnels to connect computing device 700 to proxy frontends 502 of the proxy service 550 to use proxy service 550.

In some examples, overlay access application 770 may be configured to communicate with broadcasting overlay 110, such as via proxy service 550, including encrypting messages sent to broadcasting overlay 110 and decrypting messages received from broadcasting overlay 110 that are intended for the user of computing device 700. For example, when the user uses overlay access application to send a message to another user via broadcasting overlay 110, overlay access application 770 may determine an encryption key associated with the recipient of the message.

Overlay application 770 may also determine, such as via ARKs broadcasted by services 104 over broadcasting overlay 110 and received by overlay application 770, a secure storage service in broadcasting overlay 110 having a role of being a secure storage service for the recipient of the message and an encryption key associated with the secure storage service. Overlay application 770 may also determine, via the ARKs, one or more mixing services in broadcasting overlay 110 to perform mixing of the message in overlay application 770 and may determine one or more encryption keys associated with the one or more mixing services. Overlay application 770 may therefore encrypt the message using the encryption key associated with the recipient of the message, the encryption key associated with the secure storage service, and the one or more encryption keys associated with the one or more mixing services to generate an encrypted message and may send the message via broadcasting overlay 110 to the intended recipient.

Overlay application 770 may also listen for encrypted messages being broadcasted by broadcasting overlay 110 that are intended for the user of computing device 700. Overlay application 770 may listen for encrypted messages from broadcasting overlay 110 and may attempt to decrypt encrypted messages broadcasted by broadcasting overlay 110 using an encryption key associated with the user of computing device 700. If overlay application 770 is able to successfully decrypt an encrypted message using the encryption key associated with the user of computing device 700, overlay application 770 may perform one or more actions on the decrypted message, such as by displaying the decrypted message at one or more output devices 746.

FIG. 8 is a flowchart illustrating an example mode of operation for a computing device to use an overlay to securely communicate with services and computing devices, in accordance with aspects of the present disclosure. FIG. 8 is described below in the context of computing device 120A of FIG. 1.

As shown in FIG. 8, computing device 120A associated with a user may periodically receive, from a broadcasting overlay 110 that includes a dynamic topology of a plurality of nodes 102 in a network 112, an announcement from a plurality of services 104 at a plurality of servers connected to the broadcasting overlay 110, wherein the announcement indicates a plurality of roles associated with the plurality of services 104 and information associated with a plurality of encryption keys that are associated with the plurality of services 104 (802).

Computing device 120A may determine, based at least in part on the announcement, a service associated with a specified role (804). Computing device 120A may encrypt, using an encryption key associated with the service that is derived from at least the information associated with the plurality of encryption keys as indicated by the announcement, a message to be sent to the service to generate an encrypted message (806). Computing device 120A may send the encrypted message to one or more of the plurality of nodes 102 to enable the broadcasting overlay 110 to perform best effort broadcasting of the encrypted message to propagate the encrypted message throughout the broadcasting overlay 110 to the service (808).

FIG. 9 is a flowchart illustrating an example mode of operation for nodes of a broadcasting overlay to broadcast end-to-end encrypted messages, in accordance with aspects of the present disclosure. FIG. 9 is described below in the context of overlay network 110, nodes 102, computing devices 120, and services 104 of FIG. 1.

As shown in FIG. 9, a dynamic topology of a plurality of nodes 102 that form a broadcasting overlay 110 over a network 112 for performing best effort broadcasting of data through the broadcasting overlay 110 may receive, from a first computing device of a plurality of computing devices 120 connected to the broadcasting overlay 110, a first encrypted message (902). The plurality of nodes 102 may perform best effort broadcasting of the first encrypted message through the broadcasting overlay 110 to send, in an end-to-end encrypted manner, the first encrypted message to a first service of a plurality of services 104 at a plurality of servers connected to the plurality of nodes 102 (904). The plurality of nodes 102 may receive, from the plurality of services 104, a second encrypted message (906). The plurality of nodes 102 may perform best effort broadcasting of the second encrypted message to propagate the second encrypted message throughout the broadcasting overlay 110 to send, in the end-to-end encrypted manner, the second encrypted message to a second computing device of the plurality of computing devices 120 connected to the broadcasting overlay 110 (908).

The disclosure includes the following examples.

Example 1: A method includes periodically receiving, by a computing device associated with a user and from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services; determining, by the computing device and based at least in part on the announcement, a service associated with a specified role; encrypting, by the computing device and using an encryption key associated with the service that is derived from at least the information associated with the plurality of encryption keys as indicated by the announcement, a message to be sent to the service to generate an encrypted message; and sending, by the computing device, the encrypted message to one or more of the plurality of nodes to enable the broadcasting overlay to perform best effort broadcasting of the encrypted message to propagate the encrypted message throughout the broadcasting overlay to the service.

Example 2: The method of example 1, wherein: determining the service associated with the specified role further includes determining, by the computing device and based at least in part on the announcement, the service associated with the specified role of storing messages intended for a second user associated with a second computing device; and encrypting the message to be sent to the server to generate the encrypted message further includes encrypting, by the computing device and using at least an encryption key associated with the second user, the message to generate the encrypted message.

Example 3: The method of any of examples 1 and 2, wherein: determining the service associated with the specified role further includes determining, by the computing device and based at least in part on the announcement, one or more services associated with a role of mixing messages received by the broadcasting overlay; and encrypting the message to be sent to the server to generate the encrypted message further includes encrypting, by the computing device and using each of one or more encryption keys associated with the one or more services, the message to generate the encrypted message to enable the one or more services to each perform mixing of messages including the encrypted message.

Example 4: The method of any of examples 1-3, wherein sending the encrypted message to one or more of the plurality of nodes further includes: generating, by the computing device, a second message that includes the encrypted message and an indication of a number of mixing services of the plurality of services that are to perform mixing of messages; encrypting, by the computing device, the second message to generate a second encrypted message; and sending, by the computing device, the second encrypted message to the one or more of the plurality of nodes to enable the broadcasting overlay to perform best effort broadcasting of the second encrypted message to propagate the second encrypted message throughout the broadcasting overlay to the service and to enable the number of mixing services to each perform mixing of messages including the second encrypted message.

Example 5: The method of any of examples 1-4, further includes determining, by the computing device and based at least in part on the announcement, a second service of the plurality of services associated with a role of storing messages intended for the user; periodically polling, by the computing device via the broadcasting overlay, the second service for the messages intended for the user sent by one or more other entities; and in response to polling the second service, receiving, by the computing device and from the second service via the broadcasting overlay, one or more messages intended for the user.

Example 6: The method of example 5, further includes registering, by the computing device, the user with a pseudonymous offline directory (POD) service; and in response to registering the user with the POD service, receiving an indication of an identity-based encryption key for the user.

Example 7: The method of example 6, further includes decrypting, by the computing device and using the identity-based encryption key for the user, the one or more messages intended for the user.

Example 8: The method of example 6, wherein receiving the identity-based encryption key for the user further comprises: in response to registering the user with the POD service, receiving, by the computing device and from the POD service, a random identifier; encrypting, by the computing device using a one-time response key, the random identifier to generate an encrypted random identifier; sending, by the computing device to the POD service, the encrypted random identifier; in response to sending the encrypted random identifier, receiving, by the computing device and from the POD service, an encrypted identity-based encryption key for the user; and decrypting, by the computing device using the one-time response key, the encrypted identity-based encryption key for the user to determine the identity-based encryption key for the user.

Example 9: The method of any of claims 2-8, wherein encrypting, using at least the encryption key associated with the second user, the message to generate the encrypted message further comprises: determining, by the computing device, the encryption key associated with the second user based at least in part on a pseudonym associated with the second user; and encrypting, by the computing device and using at least the encryption key associated with the second user, the message to generate the encrypted message.

Example 10: The method of any of examples 1-9, wherein sending the encrypted message to one or more of the plurality of nodes to enable the broadcasting overlay to perform best effort broadcasting of the encrypted message to propagate the encrypted message throughout the broadcasting overlay to the service further comprises: sending, by the computing device, the encrypted message via one or more proxy front-ends that interface, via an associated proxy back-end, with the broadcasting overlay to the one or more of the plurality of nodes.

Example 11: The method of example 10, further includes sending, by the computing device, a proxy setup request through the broadcasting overlay to a storage service of the plurality of services that is periodically polled by a proxy setup fulfiller; in response to sending the proxy setup request, receiving, by the computing device and from the proxy setup fulfiller, indications of a sequence of the one or more proxy front-ends that interface, via the associated proxy back-end, with the broadcasting overlay; and creating, by the computing device, one or more tunnels between the computing device and the one or more proxy front-ends to communicate over the broadcasting overlay.

Example 12: The method of example 10, further includes sending, by the computing device to one or more computing devices associated with one or more contacts of the user, indications of the one or more proxy front-ends that interface with the broadcasting overlay to enable the one or more computing devices to use the one or more proxy front-ends to communicate with the broadcasting overlay.

Example 13: The method of example 10, further includes receiving, by the computing device from another computing device associated with a contact of the user, an indication of the one or more proxy front-ends that interface, via the associated proxy back-end, with the broadcasting overlay to enable the one or more computing devices to use the one or more proxy front-ends to communicate with the broadcasting overlay.

Example 14: A computing device includes memory; and processing circuitry operably coupled to the memory and configured to: periodically receive, from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services; determine, based at least in part on the announcement, a service associated with a specified role; encrypt, using an encryption key associated with the service that is derived from at least the information associated with the plurality of encryption keys as indicated by the announcement, a message to be sent to the service to generate an encrypted message; and send the encrypted message to one or more of the plurality of nodes to enable the broadcasting overlay to perform best effort broadcasting of the encrypted message to propagate the encrypted message throughout the broadcasting overlay to the service.

Example 15: The computing device of example 14, wherein: to determine the service associated with the specified role, the processing circuitry is further configured to determine, based at least in part on the announcement, the service associated with the specified role of storing messages intended for a second user associated with a second computing device; and to encrypt the message to be sent to the server to generate the encrypted message, the processing circuitry is further configured to encrypt, using at least an encryption key associated with the second user, the message to generate the encrypted message.

Example 16: The computing device of example 14, wherein: to determine the service associated with the specified role, the processing circuitry is further configured to determine, based at least in part on the announcement, one or more services associated with a role of mixing messages received by the broadcasting overlay; and to encrypt the message to be sent to the server to generate the encrypted message, the processing circuitry is further configured to encrypt, using each of one or more encryption keys associated with the one or more services, the message to generate the encrypted message to enable the one or more services to each perform mixing of messages including the encrypted message.

Example 17: The computing device of any of examples 14-16, wherein to send the encrypted message to one or more of the plurality of nodes, the processing circuitry is further configured to: generate a second message that includes the encrypted message and an indication of a number of mixing services of the plurality of services that are to perform mixing of messages; encrypt the second message to generate a second encrypted message; and send the second encrypted message to the one or more of the plurality of nodes to enable the broadcasting overlay to perform best effort broadcasting of the second encrypted message to propagate the second encrypted message throughout the broadcasting overlay to the service and to enable the number of mixing services to each perform mixing of messages including the second encrypted message.

Example 18: The computing device of any of examples 14-17, wherein the processing circuitry is further configured to: determine, based at least in part on the announcement, a second service of the plurality of services associated with a role of storing messages intended for a user of the computing device; periodically poll, via the broadcasting overlay, the second service for the messages intended for the user sent by one or more other entities; and in response to polling the second service, receive, from the second service via the broadcasting overlay, one or more messages intended for a user of the computing device.

Example 19: The computing device of example 18, wherein the processing circuitry is further configured to: register the user with a pseudonymous offline directory (POD) service; in response to registering the user with the POD service, receive an indication of an identity-based encryption key for the user; and decrypt, using the identity-based encryption key for the user, the one or more messages intended for the user.

Example 20: A computer-readable storage medium storing instructions that, when executed by one or more processors, cause the one or more processors to: periodically receive, from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services; determine, based at least in part on the announcement, a service associated with a specified role; encrypt, using an encryption key associated with the service that is derived from at least the information associated with the plurality of encryption keys as indicated by the announcement, a message to be sent to the service to generate an encrypted message; and send the encrypted message to one or more of the plurality of nodes to enable the broadcasting overlay to perform best effort broadcasting of the encrypted message to propagate the encrypted message throughout the broadcasting overlay to the service.

Example 21: A system includes a plurality of services at a plurality of servers; and a dynamic topology of a plurality of nodes connected to the plurality of servers that form a broadcasting overlay over a network for performing best effort broadcasting of data through the broadcasting overlay, wherein the plurality of nodes are configured to: receive, from a first computing device of a plurality of computing devices connected to the broadcasting overlay, a first encrypted message; perform best effort broadcasting of the first encrypted message through the broadcasting overlay to send, in an end-to-end encrypted manner, the first encrypted message to a first service of the plurality of services at the plurality of servers connected to the plurality of nodes; receive, from the plurality of services, a second encrypted message; and perform best effort broadcasting of the second encrypted message to propagate the second encrypted message through the broadcasting overlay to send, in the end-to-end encrypted manner, the second encrypted message to a second computing device of the plurality of computing devices connected to the broadcasting overlay.

Example 22: The system of example 21, wherein the plurality of nodes are further configured to: periodically receive, from the plurality of services, announcements of roles and encryption keys associated with the plurality of services; and in response to receiving the announcement of the roles and public encryption keys, perform best effort broadcasting of the announcement of roles and encryption keys to propagate the announcement throughout the broadcasting overlay to the plurality of computing devices connected to the broadcasting overlay.

Example 23: The system of example 22, wherein to periodically receive the announcements of the roles and encryption keys, the plurality of nodes are further configured to: periodically receive, from the plurality of services, a plurality of ephemeral encryption keys periodically generated by the plurality of services.

Example 24: The system of any of examples 22 and 23, wherein: the first encrypted message is encrypted by a first public encryption key associated with the first service; the first encrypted message contains a message intended for a user of the second computing device; and the first encrypted message is further encrypted by a second public encryption key associated with the user of the second computing device.

Example 25: The system of any of examples 22-24, wherein: the second encrypted message contains the message intended for a user of the second computing device; and the second encrypted message is encrypted by an public encryption key associated with the user of the second computing device and is not encrypted by an encryption key associated with the first service.

Example 26: The system of any of examples 22-25, wherein a mixing service of the plurality of services is configured to: decrypt, using an encryption key associated with the mixing service, the first encrypted message to generate a third encrypted message; perform message mixing of a sequence of messages that include the third encrypted message to shuffle the order of the sequence of messages to generate a shuffled sequence of messages; and transmit the shuffled sequence of messages to the plurality of nodes.

Example 27: The system of any of examples 22-26, wherein: a first mixing service of the plurality of services is configured to: decrypt, using an encryption key associated with the first mixing service, the first encrypted message to generate a third encrypted message that is encrypted using an encryption key associated with a second mixing service; perform message mixing of a first sequence of messages that include the third encrypted message to shuffle the order of the first sequence of messages to generate a first shuffled sequence of messages; and transmit the first shuffled sequence of messages to the plurality of nodes; and the second mixing service of the plurality of services is configured to: decrypt, using the encryption key associated with the second mixing service, the third encrypted message to generate a fourth encrypted message; perform message mixing of a second sequence of messages that include the fourth encrypted message to shuffle the order of the second sequence of messages to generate a second shuffled sequence of messages; and transmit the second shuffled sequence of messages to the plurality of nodes.

Example 28: The system of any of examples 21-27, further includes receive, from the plurality of computing devices, registration requests for users of the plurality of computing devices; in response to receiving the registration requests, verify an identity of each of the users of the plurality of computing devices; in response to successfully verifying the identity of each of the users, enroll the users of the plurality of computing devices, including storing a pseudonym for each of the users; and periodically send indications of the pseudonyms of each of the users to the plurality of services.

Example 29: The system of example 28, wherein the POD service is further configured to: generate, for each of the users, a corresponding identity-based encryption key; and send, to each respective computing device of the computing devices, the corresponding identity-based encryption key for a corresponding user of the respective computing device.

Example 30: The system of any of examples 21-29, wherein one or more of the plurality of nodes are connected to a proxy backend of a cloud-based anonymity and privacy-assisting personal proxy environment to communicate with one or more of the plurality of the computing devices.

Example 31: A method includes receiving, by a dynamic topology of a plurality of nodes that form a broadcasting overlay over a network for performing best effort broadcasting of data through the broadcasting overlay, from a first computing device of a plurality of computing devices connected to the broadcasting overlay, a first encrypted message; performing, by the plurality of nodes, best effort broadcasting of the first encrypted message through the broadcasting overlay to send, in an end-to-end encrypted manner, the first encrypted message to a first service of a plurality of services at a plurality of servers connected to the plurality of nodes; receiving, by the plurality of nodes and from the plurality of services, a second encrypted message; and performing, by the plurality of nodes, best effort broadcasting of the second encrypted message to propagate the second encrypted message throughout the broadcasting overlay to send, in the end-to-end encrypted manner, the second encrypted message to a second computing device of the plurality of computing devices connected to the broadcasting overlay.

Example 32: The method of example 31, further includes periodically receiving, by the plurality of nodes and from the plurality of services, announcements of roles and encryption keys associated with the plurality of services; and in response to receiving the announcement of the roles and public encryption keys, performing, by the plurality of nodes, best effort broadcasting of the announcement of roles and encryption keys to propagate the announcement throughout the broadcasting overlay to the plurality of computing devices connected to the broadcasting overlay.

Example 33: The method of example 32, wherein periodically receiving the announcements of the roles and encryption keys further includes: periodically receiving, by the plurality of nodes and from the plurality of services, a plurality of ephemeral encryption keys periodically generated by the plurality of services.

Example 34: The method of any of examples 32 and 33, wherein: the first encrypted message is encrypted by a first public encryption key associated with the first service; the first encrypted message contains a message intended for a user of the second computing device; and the first encrypted message is further encrypted by a second public encryption key associated with the user of the second computing device.

Example 35: The method of any of examples 32-34, wherein: the second encrypted message contains the message intended for a user of the second computing device; and the second encrypted message is encrypted by an public encryption key associated with the user of the second computing device and is not encrypted by an encryption key associated with the first service.

Example 36: The method of any of examples 32-35, further includes decrypting, by a mixing service of the plurality of services and using an encryption key associated with the mixing service, the first encrypted message to generate a third encrypted message; performing, by the mixing service, message mixing of a sequence of messages that include the third encrypted message to shuffle the order of the sequence of messages to generate a shuffled sequence of messages; and transmitting, by the mixing service, the shuffled sequence of messages to the plurality of nodes.

Example 37: The method of any of examples 32-36, further includes decrypting, by a first mixing service of the plurality of services and using an encryption key associated with the first mixing service, the first encrypted message to generate a third encrypted message that is encrypted using an encryption key associated with a second mixing service; performing, by the first mixing service, message mixing of a first sequence of messages that include the third encrypted message to shuffle the order of the first sequence of messages to generate a first shuffled sequence of messages; transmitting, by the first mixing service, the first shuffled sequence of messages to the plurality of nodes; decrypting, by the second mixing service of the plurality of services and using the encryption key associated with the second mixing service, the third encrypted message to generate a fourth encrypted message; performing, by the second mixing service, message mixing of a second sequence of messages that include the fourth encrypted message to shuffle the order of the second sequence of messages to generate a second shuffled sequence of messages; and transmitting, by the second mixing service, the second shuffled sequence of messages to the plurality of nodes.

Example 38: The method of any of examples 31-37, further includes receiving, by a pseudonymous offline directory (POD) service from the plurality of computing devices, registration requests for users of the plurality of computing devices; in response to receiving the registration requests, verifying, by the POD service, an identity of each of the users of the plurality of computing devices; in response to successfully verifying the identity of each of the users, enrolling, by the POD service, the users of the plurality of computing devices, including storing a pseudonym for each of the users; and periodically sending, by the POD service, indications of the pseudonyms of each of the users to the plurality of services.

Example 39: The method of example 38, further includes generating, by the POD service for each of the users, a corresponding IBE encryption key; and sending, by the POD service to each respective computing device of the computing devices, the corresponding IBE encryption key for a corresponding user of the respective computing device.

Example 40: A computer-readable storage medium storing instructions that, when executed by one or more processors of one or more of a plurality of nodes that form a broadcasting overlay over a network for performing best effort broadcasting of data through the broadcasting overlay, cause the one or more processors to: receive, from a first computing device of a plurality of computing devices connected to the broadcasting overlay, a first encrypted message; perform best effort broadcasting of the first encrypted message through the broadcasting overlay to send, in an end-to-end encrypted manner, the first encrypted message to a first service of a plurality of services at a plurality of servers connected to the plurality of nodes; receive, from the plurality of services, a second encrypted message; and perform best effort broadcasting of the second encrypted message to propagate the second encrypted message throughout the broadcasting overlay to send, in the end-to-end encrypted manner, the second encrypted message to a second computing device of the plurality of computing devices connected to the broadcasting overlay.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:

periodically receiving, by a computing device associated with a user and from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services;

determining, by the computing device and based at least in part on the announcement, a service associated with a specified role;

encrypting, by the computing device and using an encryption key associated with the service that is derived from at least the information associated with the plurality of encryption keys as indicated by the announcement, a message to be sent to the service to generate an encrypted message; and sending, by the computing device, the encrypted message to one or more of the plurality of nodes to enable the broadcasting overlay to perform best effort broadcasting of the encrypted message to propagate the encrypted message throughout the broadcasting overlay to the service.

2. The method of claim 1, wherein:

determining the service associated with the specified role further includes determining, by the computing device and based at least in part on the announcement, the service associated with the specified role of storing messages intended for a second user associated with a second computing device; and encrypting the message to be sent to the service to generate the encrypted message further includes encrypting, by the computing device and using at least an encryption key associated with the second user, the message to generate the encrypted message.

3. The method of claim 1, wherein:

determining the service associated with the specified role further includes determining, by the computing device and based at least in part on the announcement, one or more services associated with a role of mixing messages received by the broadcasting overlay; and encrypting the message to be sent to the service to generate the encrypted message further includes encrypting, by the computing device and using each of one or more encryption keys associated with the one or more services, the message to generate the encrypted message to enable the one or more services to each perform mixing of messages including the encrypted message.

4. The method of claim 1, wherein sending the encrypted message to one or more of the plurality of nodes further includes:

generating, by the computing device, a second message that includes the encrypted message and an indication of a number of mixing services of the plurality of services that are to perform mixing of messages;

encrypting, by the computing device, the second message to generate a second encrypted message; and sending, by the computing device, the second encrypted message to the one or more of the plurality of nodes to enable the broadcasting overlay to perform best effort broadcasting of the second encrypted message to propagate the second encrypted message throughout the broadcasting overlay to the service and to enable the number of mixing services to each perform mixing of messages including the second encrypted message.

5. The method of claim 1, further comprising:

determining, by the computing device and based at least in part on the announcement, a second service of the plurality of services associated with a role of storing messages intended for the user;

periodically polling, by the computing device via the broadcasting overlay, the second service for the messages intended for the user sent by one or more other entities; and in response to polling the second service, receiving, by the computing device and from the second service via the broadcasting overlay, one or more messages intended for the user.

6. The method of claim 5, further comprising:

registering, by the computing device, the user with a pseudonymous offline directory (POD) service; and in response to registering the user with the POD service, receiving an indication of an identity-based encryption key for the user.

7. The method of claim 6, further comprising:

decrypting, by the computing device and using the identity-based encryption key for the user, the one or more messages intended for the user.

8. The method of claim 6, wherein receiving the identity-based encryption key for the user further comprises:

in response to registering the user with the POD service, receiving, by the computing device and from the POD service, a random identifier;

encrypting, by the computing device using a one-time response key, the random identifier to generate an encrypted random identifier;

sending, by the computing device to the POD service, the encrypted random identifier;

in response to sending the encrypted random identifier, receiving, by the computing device and from the POD service, an encrypted identity-based encryption key for the user; and decrypting, by the computing device using the one-time response key, the encrypted identity-based encryption key for the user to determine the identity-based encryption key for the user.

9. The method of claim 2, wherein encrypting, using at least the encryption key associated with the second user, the message to generate the encrypted message further comprises:

determining, by the computing device, the encryption key associated with the second user based at least in part on a pseudonym associated with the second user; and encrypting, by the computing device and using at least the encryption key associated with the second user, the message to generate the encrypted message.

10. The method of claim 1, wherein sending the encrypted message to one or more of the plurality of nodes to enable the broadcasting overlay to perform best effort broadcasting of the encrypted message to propagate the encrypted message throughout the broadcasting overlay to the service further comprises:

sending, by the computing device, the encrypted message via one or more proxy front-ends that interface, via an associated proxy back-end, with the broadcasting overlay to the one or more of the plurality of nodes.

11. The method of claim 10, further comprising:

sending, by the computing device, a proxy setup request through the broadcasting overlay to a storage service of the plurality of services that is periodically polled by a proxy setup fulfiller;

in response to sending the proxy setup request, receiving, by the computing device and from the proxy setup fulfiller, indications of a sequence of the one or more proxy front-ends that interface, via the associated proxy back-end, with the broadcasting overlay; and creating, by the computing device, one or more tunnels between the computing device and the one or more proxy front-ends to communicate over the broadcasting overlay.

12. The method of claim 10, further comprising:

sending, by the computing device to one or more computing devices associated with one or more contacts of the user, indications of the one or more proxy front-ends that interface with the broadcasting overlay to enable the one or more computing devices to use the one or more proxy front-ends to communicate with the broadcasting overlay.

13. The method of claim 10, further comprising:

receiving, by the computing device from another computing device associated with a contact of the user, an indication of the one or more proxy front-ends that interface, via the associated proxy back-end, with the broadcasting overlay to enable the one or more computing devices to use the one or more proxy front-ends to communicate with the broadcasting overlay.

14. A computing device comprising:

memory; and processing circuitry operably coupled to the memory and configured to:

periodically receive, from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services;

determine, based at least in part on the announcement, a service associated with a specified role;

encrypt, using an encryption key associated with the service that is derived from at least the information associated with the plurality of encryption keys as indicated by the announcement, a message to be sent to the service to generate an encrypted message; and send the encrypted message to one or more of the plurality of nodes to enable the broadcasting overlay to perform best effort broadcasting of the encrypted message to propagate the encrypted message throughout the broadcasting overlay to the service.

15. The computing device of claim 14, wherein:

to determine the service associated with the specified role, the processing circuitry is further configured to determine, based at least in part on the announcement, the service associated with the specified role of storing messages intended for a second user associated with a second computing device; and to encrypt the message to be sent to the service to generate the encrypted message, the processing circuitry is further configured to encrypt, using at least an encryption key associated with the second user, the message to generate the encrypted message.

16. The computing device of claim 14, wherein:

to determine the service associated with the specified role, the processing circuitry is further configured to determine, based at least in part on the announcement, one or more services associated with a role of mixing messages received by the broadcasting overlay; and to encrypt the message to be sent to the service to generate the encrypted message, the processing circuitry is further configured to encrypt, using each of one or more encryption keys associated with the one or more services, the message to generate the encrypted message to enable the one or more services to each perform mixing of messages including the encrypted message.

17. The computing device of claim 14, wherein to send the encrypted message to one or more of the plurality of nodes, the processing circuitry is further configured to:

generate a second message that includes the encrypted message and an indication of a number of mixing services of the plurality of services that are to perform mixing of messages;

encrypt the second message to generate a second encrypted message; and send the second encrypted message to the one or more of the plurality of nodes to enable the broadcasting overlay to perform best effort broadcasting of the second encrypted message to propagate the second encrypted message throughout the broadcasting overlay to the service and to enable the number of mixing services to each perform mixing of messages including the second encrypted message.

18. The computing device of claim 14, wherein the processing circuitry is further configured to:

determine, based at least in part on the announcement, a second service of the plurality of services associated with a role of storing messages intended for a user of the computing device;

periodically poll, via the broadcasting overlay, the second service for the messages intended for the user sent by one or more other entities; and in response to polling the second service, receive, from the second service via the broadcasting overlay, one or more messages intended for the user of the computing device.

19. The computing device of claim 18, wherein the processing circuitry is further configured to:

register the user with a pseudonymous offline directory (POD) service;

in response to registering the user with the POD service, receive an indication of an identity-based encryption key for the user; and decrypt, using the identity-based encryption key for the user, the one or more messages intended for the user.

20. A computer-readable storage medium storing instructions that, when executed by one or more processors, cause the one or more processors to:

periodically receive, from a broadcasting overlay that includes a dynamic topology of a plurality of nodes in a network, an announcement from a plurality of services at a plurality of servers connected to the broadcasting overlay, wherein the announcement indicates a plurality of roles associated with the plurality of services and information associated with a plurality of encryption keys that are associated with the plurality of services;

determine, based at least in part on the announcement, a service associated with a specified role;

encrypt, using an encryption key associated with the service that is derived from at least the information associated with the plurality of encryption keys as indicated by the announcement, a message to be sent to the service to generate an encrypted message; and send the encrypted message to one or more of the plurality of nodes to enable the broadcasting overlay to perform best effort broadcasting of the encrypted message to propagate the encrypted message throughout the broadcasting overlay to the service.

* * * * *